United States Patent
Kasahara et al.

(10) Patent No.: US 7,092,805 B2
(45) Date of Patent: *Aug. 15, 2006

(54) STEERING APPARATUS FOR STEERABLE VEHICLE

(75) Inventors: Toshiaki Kasahara, Kanagawa (JP); Kazutaka Adachi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/248,617

(22) Filed: Oct. 13, 2005

(65) Prior Publication Data

US 2006/0080016 A1  Apr. 13, 2006

(30) Foreign Application Priority Data

Oct. 13, 2004 (JP) ............................. 2004-299339
Dec. 14, 2004 (JP) ............................. 2004-361984

(51) Int. Cl.
*G06F 19/00* (2006.01)

(52) U.S. Cl. ..................... 701/41; 701/42; 180/446

(58) Field of Classification Search ............. 701/41, 701/42; 180/421, 422, 443, 446
See application file for complete search history.

(56) References Cited

U.S. PATENT DOCUMENTS 5,348,111 A * 9/1994 Williams et al. ............ 180/415
6,250,419 B1 * 6/2001 Chabaan et al. ............. 180/443
6,408,687 B1 * 6/2002 Ashrafi et al. .............. 73/118.1
6,505,703 B1 * 1/2003 Stout et al. .................. 180/446
6,580,987 B1 * 6/2003 Sadano et al. ................ 701/41
6,651,771 B1 * 11/2003 Chabaan ...................... 180/446
6,678,597 B1 * 1/2004 Amberkar ..................... 701/41
6,687,588 B1 * 2/2004 Demerly et al. .............. 701/41
6,719,087 B1 * 4/2004 Demerly ...................... 180/402
6,738,699 B1 * 5/2004 Yao et al. ..................... 701/41

FOREIGN PATENT DOCUMENTS

JP    10-310074 A    11/1998

* cited by examiner

*Primary Examiner*—Richard M. Camby
(74) *Attorney, Agent, or Firm*—Foley & Lardner LLP

(57) ABSTRACT

A steering apparatus for a steerable vehicle includes a steering actuator, a steering input unit, a disturbance determination section, and a steering controller. The steering actuator is configured to generate a steering effort to regulate a steering output of the vehicle, in accordance with a steering effort command. The steering input unit is configured to set a steering input. The disturbance determination section is configured to determine a disturbance indicator indicative of a disturbance input to the vehicle. The steering controller is configured to perform the following: setting a desired steering output in accordance with the steering input; setting the steering effort command in accordance with the desired steering output; adjusting the steering effort command in accordance with the disturbance indicator; and outputting the adjusted steering effort command to the steering actuator.

22 Claims, 20 Drawing Sheets

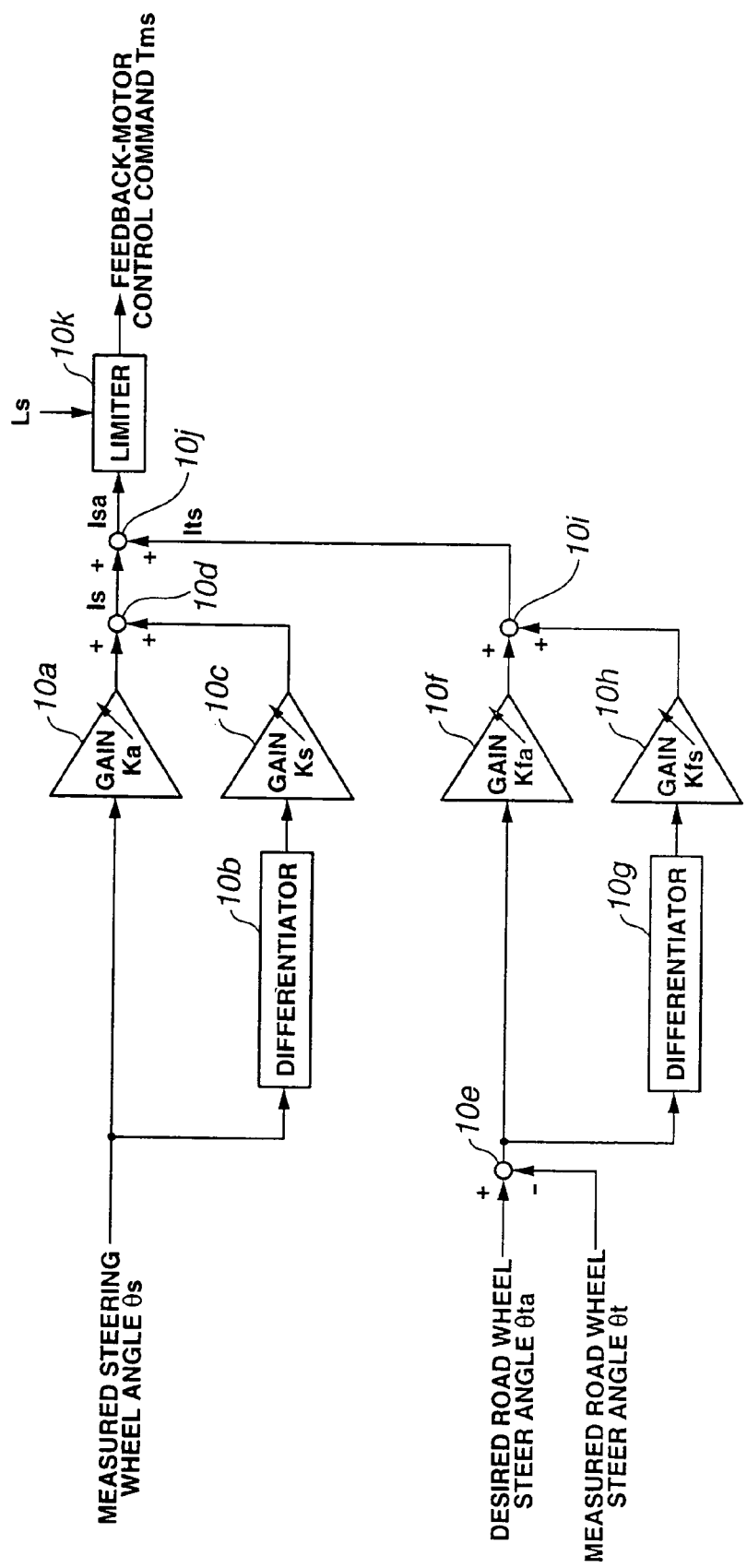

STEERING APPARATUS FOR STEERABLE VEHICLE

BACKGROUND OF THE INVENTION

The present invention relates generally to steering systems for steerable vehicles, and more particularly to a steer-by-wire system for a steerable vehicle.

A Published Japanese Patent Application No. 10-310074 (hereinafter referred to as "JP10-310074") shows a steer-by-wire device configured to control steering operation in accordance with a deviation between a desired road wheel steer angle and an actual road wheel steer angle, and in accordance with a steering load, and specifically configured to control steering operation by determining the amount of a controlled variable of steering in such a manner as to regulate the deviation between the desired road wheel steer angle and the actual road wheel steer angle to zero.

SUMMARY OF THE INVENTION

The steer-by-wire device shown in JP10-310074 is configured to quickly response to the desired road wheel steer angle, so that the actual road wheel steer angle is constantly substantially identical to the desired road wheel steer angle, which is equivalent to that the steering stiffness of the steer-by-wire device is infinitely high. Accordingly, it is possible that the steer-by-wire device of JP10-310074 does not simulate with sufficient accuracy a natural torsion between a steering-input section and a steering-output section in a typical mechanical steering device with respect to disturbance as a load to the steering-output section. Since the equivalent steering stiffness of the steer-by-wire device of JP10-310074 is high as above mentioned, the vehicle may fall in oversteer tendency on a curved road so that the slip angle of the vehicle may excessively increase to adversely affect the driving stability of the vehicle. Furthermore, the high steering stiffness may adversely affect the steering feeling and comfortability on a bumpy road, a wavy road, or a rutted road.

Accordingly, it is an object of the present invention to produce a suitable torsion between a steering-input section and a steering-output section in a steer-by-wire system, to enhance steering feeling and comfortability.

According to one aspect of the present invention, a steering apparatus for a steerable vehicle, comprises: a steering actuator configured to generate a steering effort to regulate a steering output of the vehicle, in accordance with a steering effort command; a steering input unit configured to set a steering input; a disturbance determination section configured to determine a disturbance indicator indicative of a disturbance input to the vehicle; and a steering controller connected for signal communication to the steering actuator, the steering input unit, and the disturbance determination section, and configured to perform the following: setting a desired steering output in accordance with the steering input; setting the steering effort command in accordance with the desired steering output; adjusting the steering effort command in accordance with the disturbance indicator; and outputting the adjusted steering effort command to the steering actuator.

According to another aspect of the invention, a steering apparatus for a steerable vehicle, comprises: steering actuation means for generating a steering effort to regulate a steering output of the vehicle, in accordance with a steering effort command; steering input means for setting a steering input; disturbance determination means for determining a disturbance indicator indicative of a disturbance input to the vehicle; and steering control means for performing the following: setting a desired steering output in accordance with the steering input; setting the steering effort command in accordance with the desired steering output; adjusting the steering effort command in accordance with the disturbance indicator; and outputting the adjusted steering effort command to the steering actuation means.

According to a further aspect of the invention, a method of controlling a steerable vehicle including a steering actuator configured to generate a steering effort to regulate a steering output of the vehicle, in accordance with a steering effort command; a steering input unit configured to set a steering input; and a disturbance determination section configured to determine a disturbance indicator indicative of a disturbance input to the vehicle, comprises: setting a desired steering output in accordance with the steering input; setting the steering effort command in accordance with the desired steering output; adjusting the steering effort command in accordance with the disturbance indicator; and outputting the adjusted steering effort command to the steering actuator.

BRIEF DESCRIPTION OF THE DRAWINGS

FIG. 3 is a system block diagram showing a feedback-motor control command determination section of a steering-feedback controller of the steering apparatus of FIG. 1.

DETAILED DESCRIPTION OF THE INVENTION

Figure 1:
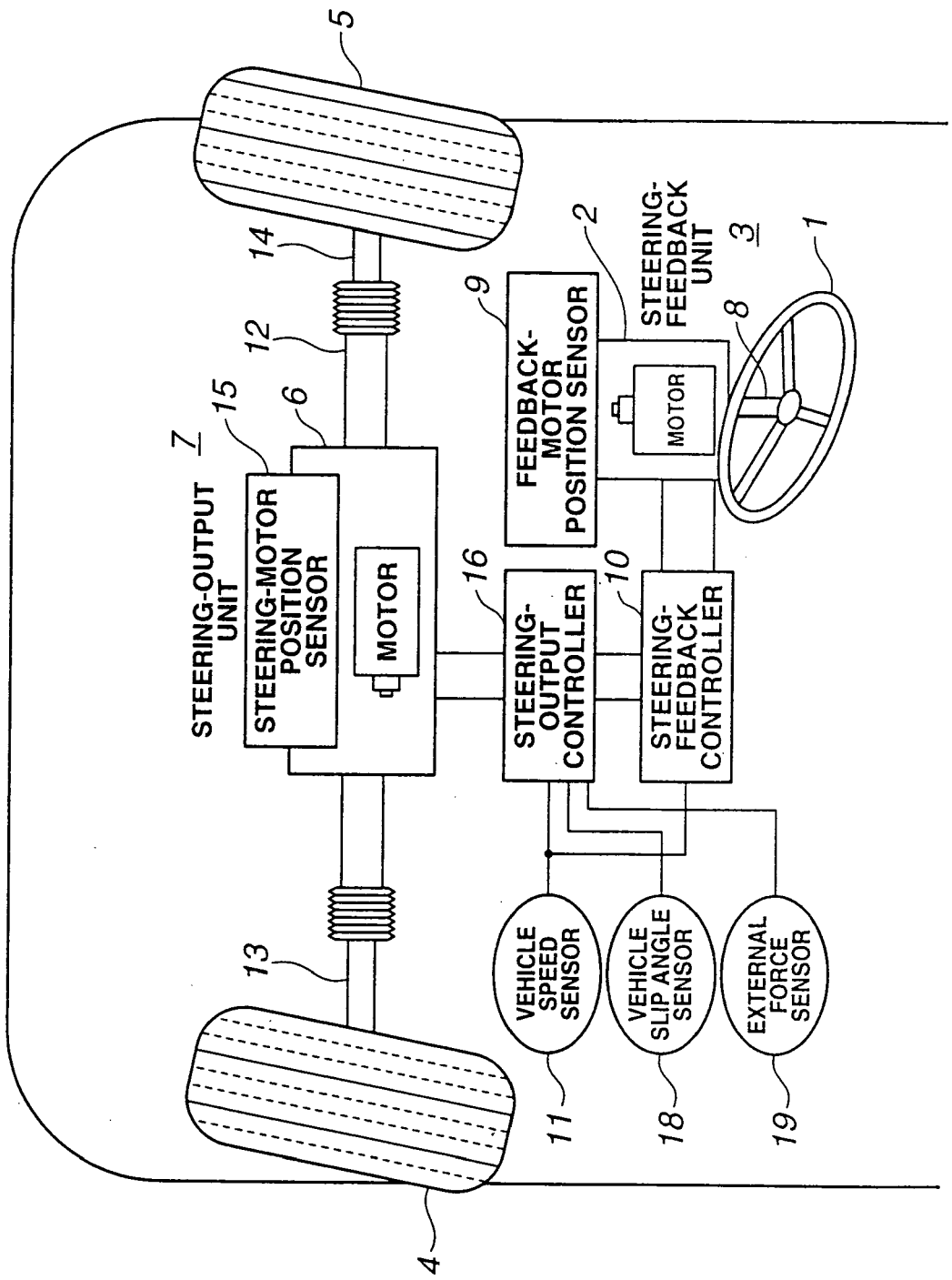
FIG. 1 is a schematic diagram showing an automotive vehicle with a steering apparatus in accordance with a first embodiment.
Figure 2:
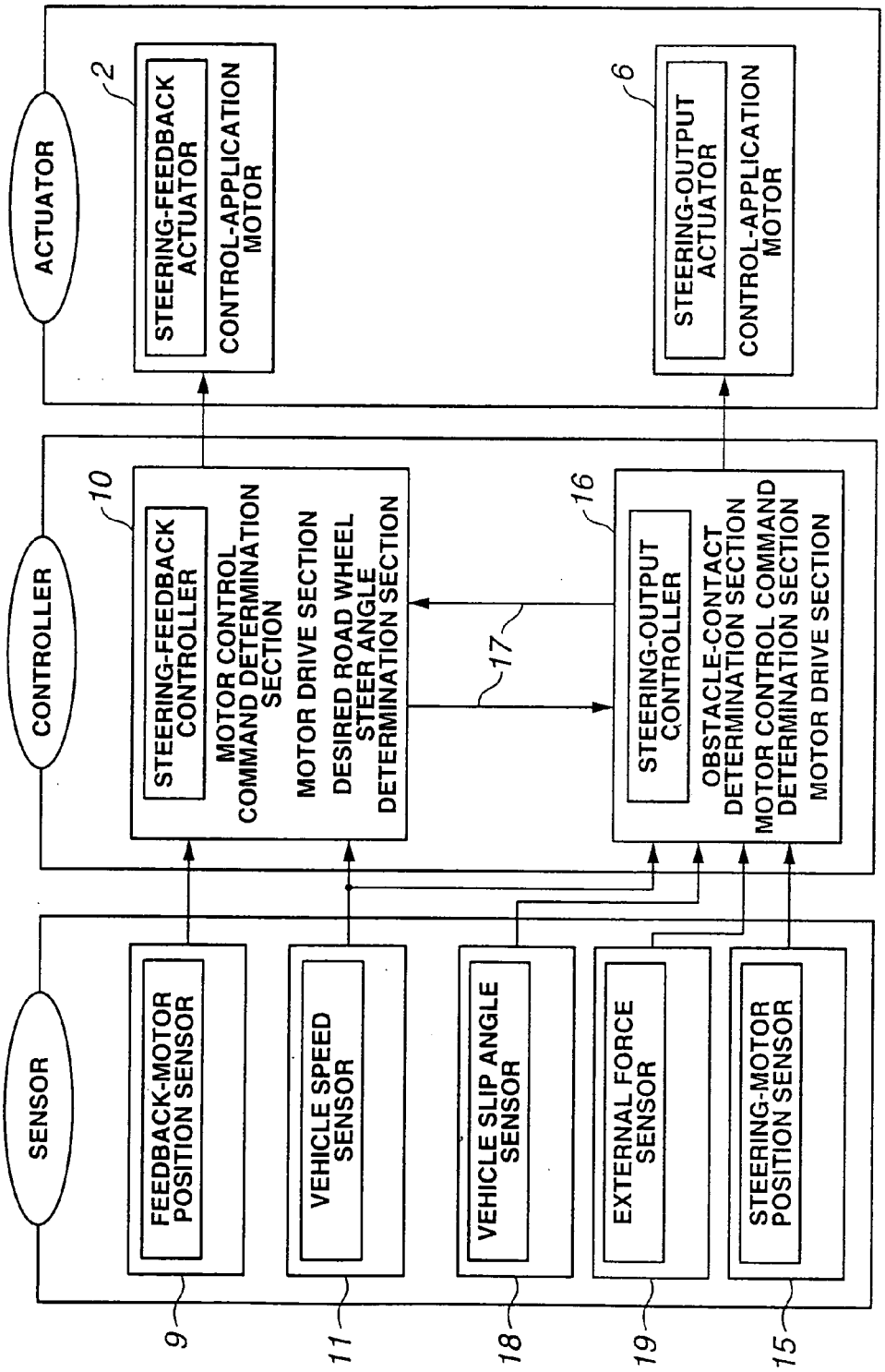
FIG. 2 is a schematic block diagram showing the steering apparatus of FIG. 1.

Referring now to FIGS. 1 through 7, there is shown a steering apparatus for a steerable vehicle in accordance with a first embodiment. FIG. 1 is a schematic diagram showing an automotive vehicle with a steering apparatus in accordance with a first embodiment. FIG. 2 is a schematic block diagram showing the steering apparatus of FIG. 1. As shown in FIG. 1, the steering apparatus of the first embodiment is a steer-by-wire apparatus including a steering-feedback unit (steering input unit) 3 for steering-input, and a steering-output unit 7 for steering output, where steering-feedback unit 3 and steering-output unit 7 are mechanically separated from each other. Steering-feedback unit 3 includes a steering wheel 1, and a steering-feedback actuator (feedback actuator) 2 for providing a feedback to steering wheel 1. Steering-output unit 7 includes a steering-output actuator (steering actuator) 6 for steering steerable road wheels 4, and 5.

Specifically, steering-feedback unit 3 includes steering wheel 1, a steering column shaft 8, and steering-feedback actuator 2 adapted to drive or rotate steering column shaft 8. Steering-feedback actuator 2 includes a control-application electric motor and a speed-reducing gear mechanism coupled for speed reduction to the electric motor. A feedback-motor position sensor 9 is provided and configured to measure the angular position of the output shaft of the electric motor. Feedback-motor position sensor 9 is used to control the motor position, and used as a steering wheel angle detection section to measure an actual steering wheel angle θs of steering wheel 1 as a steering input. The actual steering wheel angle θs may be measured by another sensor for directly sensing the angular position of steering wheel 1.

A steering-feedback controller 10 is provided and configured as an electrical control unit to control steering-feedback actuator 2. Steering-feedback controller 10 is configured to receive input data from feedback-motor position sensor 9 and from a vehicle speed sensor 11 for measuring a traveling or longitudinal speed V of the vehicle. Steering-feedback controller 10 includes a desired road wheel steer angle determination section, a feedback-motor control command determination section, and a feedback-motor drive section. The desired road wheel steer angle determination section is configured to compute a desired road wheel steer angle θta as a desired steering output in accordance with actual or measured steering wheel angle θs and vehicle speed V. The feedback-motor control command determination section is configured to compute a feedback-motor control command (steering feedback command) Tms by adding a steering-input-dependent motor control command Is and a steering-output-dependent motor control command Its to obtain a basic feedback-motor control command Isa, and by performing a limiter processing to basic feedback-motor control command Isa. The feedback-motor drive section includes a motor drive circuit converting feedback-motor control command Tms into a driving-current command to the electric motor of steering-feedback actuator 2.

Steering-output unit 7 includes steerable road wheels 4, 5, steering gear mechanism 12 coupled to steerable road wheels 4, 5 via a steering rack shaft 13, and steering-output actuator 6 for driving steering gear mechanism 12.

Like steering-feedback actuator 2, steering-output actuator 6 includes a control-application electric motor and a speed-reducing gear mechanism coupled for speed reduction to the electric motor. A steering-motor position sensor (steering output sensor) 15 is provided and configured to measure the angular position of the output shaft of the electric motor. Steering-motor position sensor 15 is used to control the motor position, and used as a road wheel steer angle detection section and as a road wheel steer angle rate detection section to measure an actual road wheel steer angle θt and its rate of change of steerable road wheels 4, 5.

A steering-output controller (steering controller) 16 is provided and configured as an electrical control unit to control steering-output actuator 6. Steering-output controller 16 is connected to steering-feedback controller 10 with a bidirectional communication line 17 for mutual data exchange. Steering-output controller 16 is configured to receive input data from vehicle speed sensor 11, steering-motor position sensor 15, a vehicle slip angle sensor 18, and an external force sensor 19. Vehicle slip angle sensor 18 is configured to measure a sideslip angle of the vehicle. Specifically, vehicle slip angle sensor 18 includes a lateral acceleration sensor and a yaw rate sensor for collecting data needed to compute actual vehicle slip angle β. External force sensor 19 is configured to measure external forces applied to steerable road wheels 4, 5. Specifically, external force sensor 19 includes an axial force sensor to measure an axial force (or steering effort) to steering rack shaft 13. Steering-output controller 16 includes an obstacle-contact determination section, a steering-motor control command determination section, and a steering-motor drive section. The obstacle-contact determination section is configured to determine whether or not steerable road wheels 4, 5 are in contact with an obstacle such as a curb. The steering-motor control command determination section is configured to basically compute a steering-motor control command by subtracting the output of a robust compensator from the output of a model matching compensator to obtain a basic steering-motor control command and by limiting the basic steering-motor current command within an upper limit. The steering-motor drive section includes a motor drive circuit converting the steering-motor control command into a driving-current command to the electric motor of steering-output actuator 6.

Figure 4C:
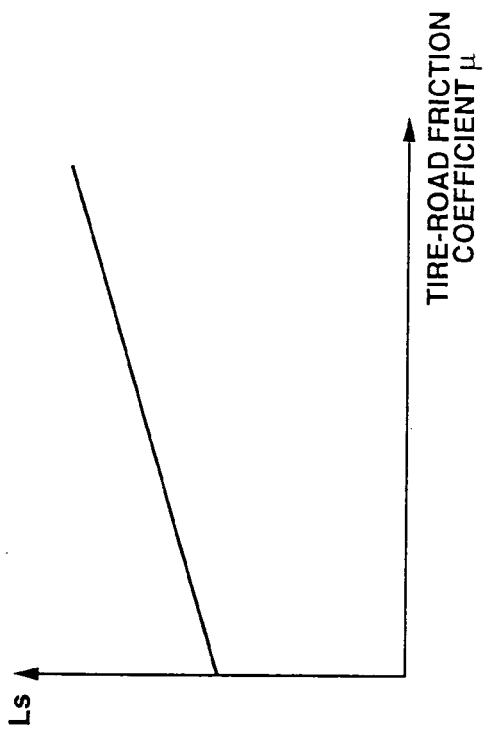
FIGS. 4A through 4C are views illustrating sample settings of gains Ka, Ks, and a limit value Ls for the feedback-motor control command determination section of FIG. 3.
Figure 4A:
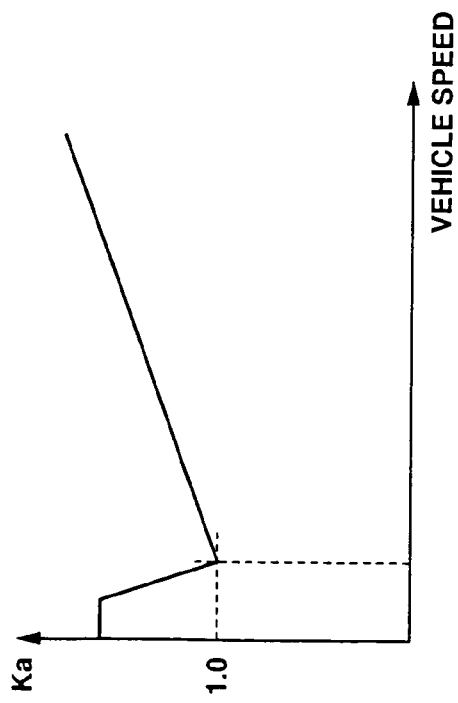
Figure 4B:
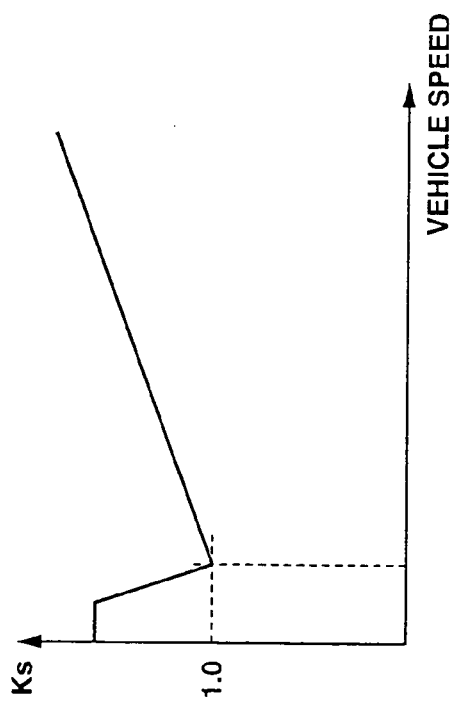

FIG. 3 is a system block diagram showing the feedback-motor control command determination section of steering-feedback controller 10. Steering-feedback controller 10 includes a processing part of computing steering-input-dependent motor control command Is, a processing part of computing steering-output-dependent motor control command Its, and a limiter processing part 10k. Specifically, as shown in FIG. 3, the processing part of computing steering-input-dependent motor control command Is includes an amplifier 10a, a differentiator 10b, an amplifier 10c, and an adder 10d. Amplifier 10a multiplies actual steering wheel angle θs by a gain Ka to output a first value (Ka·θs). Gain Ka is determined in accordance with vehicle speed V. Differentiator 10b outputs a time differential value ωs (=dθs/dt) of actual steering wheel angle θs. Amplifier 10c multiplies time differential value ωs of actual steering wheel angle θs by a gain Ks to output a second value (Ks·ωs). Gain Ks is determined in accordance with vehicle speed V. Adder 10d adds the first value (Ks·θs) and the second value (Ks·ωs) to output steering-input-dependent motor control command Is (Is=Ka·θs+Ks·ωs). FIGS. 4A and 4B are views illustrating sample settings of gains Ka, and Ks. As shown in FIG. 4A, gain Ka is set to 1.0 at a vehicle speed that frequency of starting steering operation is high, and set higher than 1.0 in regions of higher speeds and lower speeds. As shown in FIG. 4B, gain Ks is set to 1.0 at a vehicle speed that frequency of starting steering operation is high, and set higher than 1.0 in regions of higher speeds and lower speeds. On the other hand, the processing part of computing steering-output-dependent motor control command Its includes a subtracter 10e, an amplifier 10f, a differentiator 10g, an amplifier 10h, and an adder 10i. Subtracter 10e subtracts actual road wheel steer angle θt from desired road wheel steer angle θta to output a deviation (θta−θt). Amplifier 10f multiplies deviation (θta−θt) by a gain Kfa to output a first value (Kfa·(θta−θt)). Gain Kfa is determined in accordance with vehicle speed V. Differentiator 10g outputs a time differential value ωts (=d(θta−θt)/dt) of deviation (θta−θt). Amplifier 10h multiplies time differential value ωts of deviation (θta−θt) by a gain Kfs to output a second value (Kfs·ωts). Gain Kfs is determined in accordance with vehicle speed V. Adder 10i adds the first value (Kfa·(θta−θt)) and the second value (Kfs·ωts) to output steering-output-dependent motor control command Its (Its=Kfa·(θta−θt)+Kfs·ωts). Gain Kfa and gain Kfs are set up according to vehicle speed V like gains Ka and Ks as shown in FIGS. 4A and 4B. Adder 10j adds steering-input-dependent motor control command Is and steering-output-dependent motor control command Its to output a basic feedback-motor control command Isa (=Is+Its). Limiter processing section 10k limits the feedback-motor control command Isa (=Is+Its) within an upper limit value Ls, to output feedback-motor control command Tms. The limit value Ls is determined in accordance with a tire-road friction coefficient μ. The tire-road friction coefficient μ is estimated in accordance with vehicle speed V, a yaw rate ψ, and a lateral acceleration YG. FIG. 4C is a view illustrating a sample setting of limit value Ls. As shown in FIG. 4C, limit value Ls is set so as to increase with an increase in tire-road friction coefficient μ. This is effective for preventing an excessive amount of steering feedback possible to obstruct turning steering wheel 1, and thereby for providing a suitable amount of steering feedback in accordance with the estimated tire-road friction coefficient μ, at larger steering wheel angles or at higher rates of change in the steering wheel angle.

Figure 5:
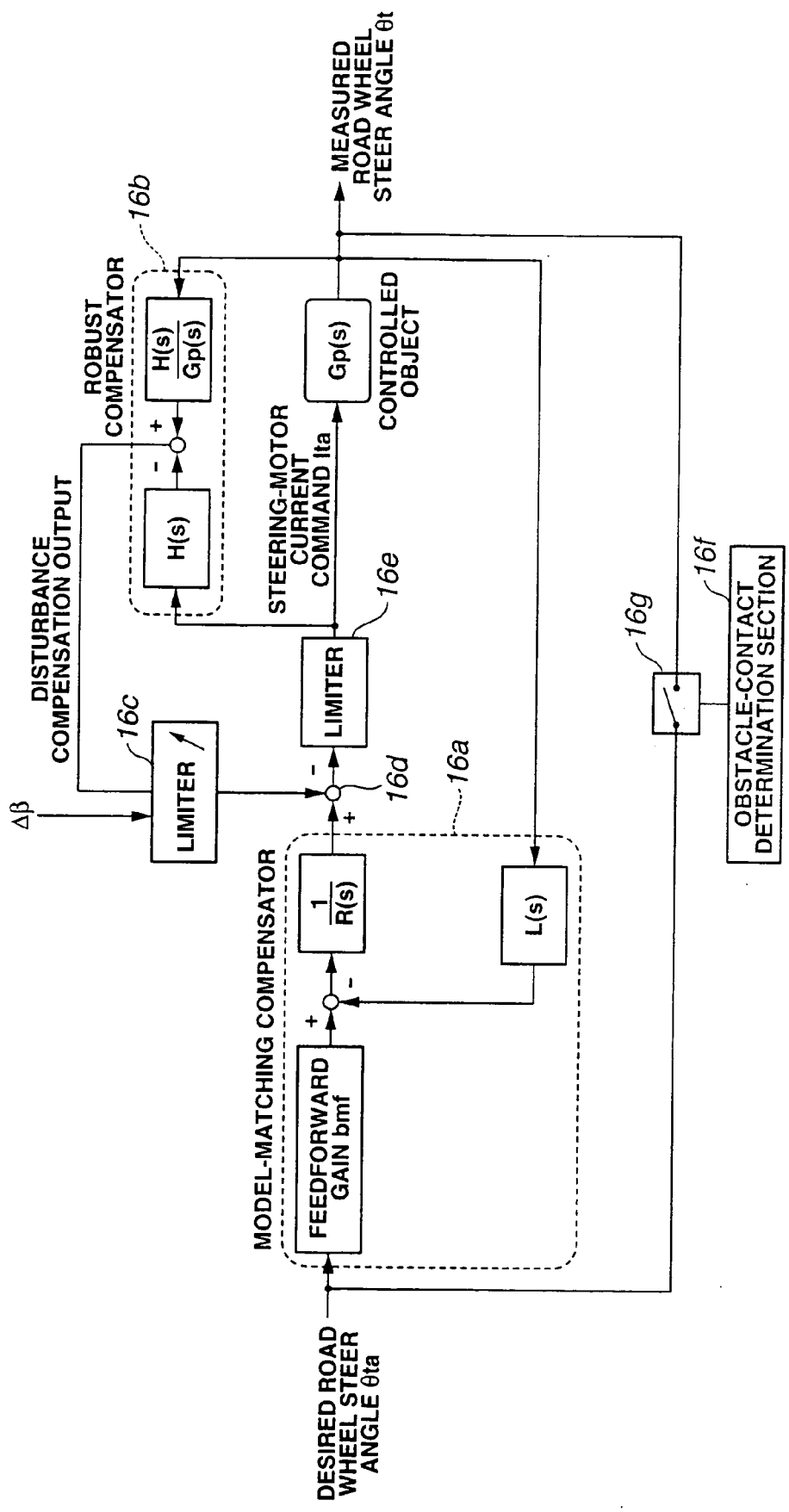
FIG. 5 is a system block diagram showing a steering-output control system constructed with a robust model matching technique in accordance with the first embodiment.

FIG. 5 is a system block diagram showing a steering-output control system constructed with a robust model matching technique in accordance with the first embodiment. The robust model matching technique is a method of predetermining a normative model of the dynamic characteristics of a target vehicle as a controlled object, such as a response of a vehicle yaw rate and a response of a lateral acceleration to steering operation, and controlling a control input with minimizing the influence of a modeling error or disturbance in such a manner that the state of the target vehicle is in agreement with the normative model. As shown in FIG. 5, steering-output controller 16 includes a model-matching compensator 16a, a robust compensator or disturbance compensator 16b, a disturbance compensation limiter 16c, a subtracter 16d, a current limiter 16e, an obstacle-contact determination section 16f, and a switch 16g.

Model-matching compensator 16a is configured as a feedforward compensator to receive desired road wheel steer angle θta and actual road wheel steer angle θt, and to output the steering-motor current command in accordance with the predetermined normative response model.

Robust compensator 16b is configured to receive motor current command Ita as an input to a controlled object and actual road wheel steer angle θt as an output from the controlled object, and to estimate a disturbance which is a control interference factor including a modeling error, and to output the estimated disturbance. The output of disturbance compensation from robust compensator 16b is used to compensate motor current command Ita (steering-motor drive command, steering-motor torque command, or steering effort command) in the steering-output control.

Disturbance compensation limiter 16c is configured to limit the disturbance compensation from robust compensator 16b so that the disturbance compensation from robust compensator 16b decreases with an increase in an external force indicator (disturbance indicator) indicative of an external force applied to steerable road wheels 4, 5, which is a deviation Δβ between desired value vehicle slip angle β* and actual vehicle slip angle β in the first embodiment. In the first embodiment, vehicle slip angle sensor 18 serves as a disturbance determination section configured to determine a disturbance indicator indicative of a disturbance input to the vehicle.

Subtracter 16d is configured to compute motor current command Ita by subtracting the limited disturbance compensation (output from disturbance compensation limiter 16c) from the motor current command (output from model-matching compensator 16a).

Current limiter 16e is configured to limit an electric current through the electric motor of steering-output actuator 6 to prevent over-current. Specifically, current limiter 16e is configured to output motor current command Ita as it is in case motor current command Ita from subtracter 16d is smaller than or equal to a predetermined current limit value, and to output the current limit value as motor current command Ita in case motor current command Ita is larger than the current limit value. The motor current command Ita is output to the motor of steering-output actuator 6 as the controlled object.

Obstacle-contact determination section 16f is configured to determine whether or not steerable road wheels 4 and 5 are in contact with an obstacle, such as a curb. Specifically, if a condition where actual road wheel steer angle θt is held substantially constant (within a variation of less than ±1 degree) in spite of driving the motor of steering-output actuator 6 with motor current command Ita continues over a set period of time such as 1 second, obstacle-contact determination section 16f determines that steerable road wheels 4 and 5 are in contact with an obstacle.

Switch 16g is configured to be turned OFF when obstacle-contact determination section 16f determines that steerable road wheels 4 and 5 are in contact with no obstacle, and to be turned ON when obstacle-contact determination section 16f determines that steerable road wheels 4 and 5 are in contact with an obstacle. With switch 16g being OFF, motor current command Ita to the electric motor of steering-output actuator 6 is computed in accordance with desired road wheel steer angle θta and actual road wheel steer angle θt with the robust model matching technique. On the other hand, with switch 16g being ON, desired road wheel steer angle θta is set to actual road wheel steer angle θt, and motor current command Ita to the electric motor of steering-output actuator 6 is computed as a low value accordingly.

Figure 6:
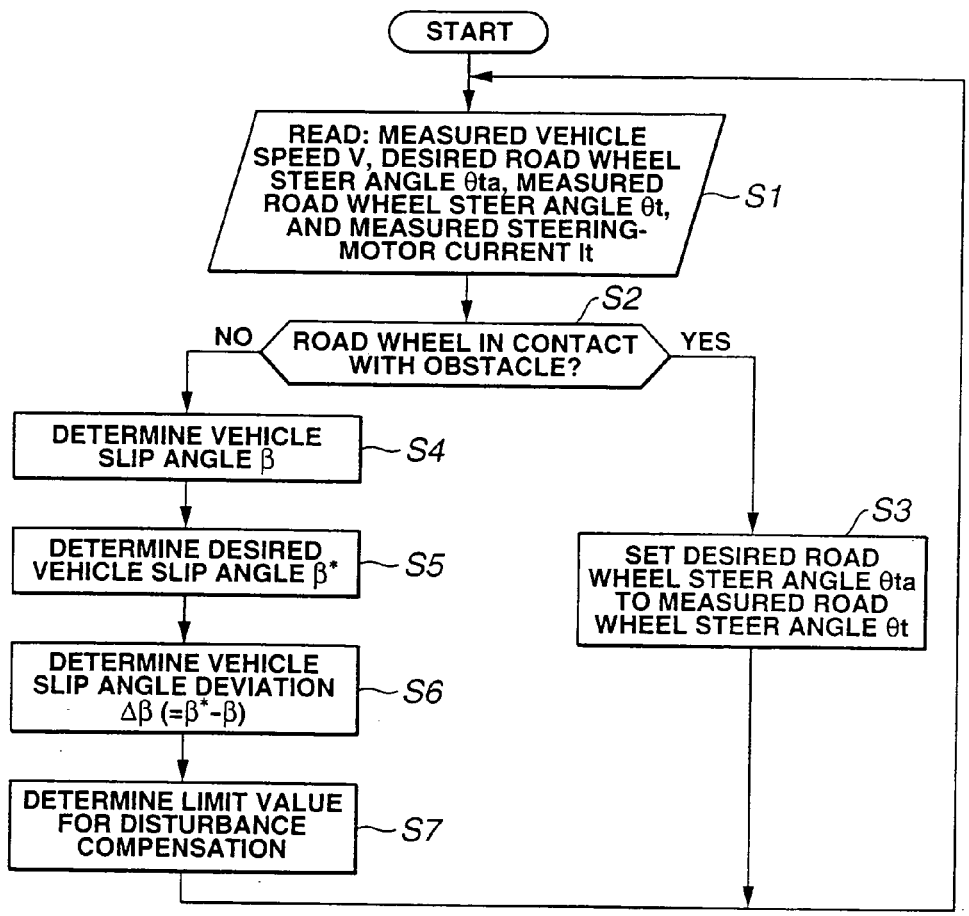
FIG. 6 is a flow chart showing a steering-output control processing to be performed by a steering-output controller of the steering apparatus of FIG. 1.

The following describes operations of the steering apparatus of the first embodiment. FIG. 6 is a flow chart showing a steering-output control processing to be performed by steering-output controller 16.

At step S1, steering-output controller 16 reads vehicle speed V from vehicle speed sensor 11, desired road wheel steer angle θta set according to actual steering wheel angle θs from feedback-motor position sensor 9, actual road wheel steer angle θt from steering-motor position sensor 15, and actual steering-motor driving current It from a steering-motor driving-current sensor (not shown) provided in the motor drive circuit. Subsequently, the routine proceeds to step S2. Covering variable steering ratio mechanisms, desired road wheel steer angle θta is determined by the following equation.

$$\theta ta = \theta s \cdot Rst$$

where Rst is a gear ratio of steering output to steering input or the reciprocal of overall steering ratio.

At step S2, steering-output controller 16 determines whether or not steerable road wheels 4, 5 are in contact with an obstacle, such as a curb. When the answer to step S2 is affirmative (YES), the routine proceeds to step S3. On the other hand, when the answer to step S2 is negative (NO), the routine proceeds to step S4. The obstacle means an object that physically obstructs an increase in the road wheel steer angle during being in contact with steerable road wheels 4, 5, like a curb. The obstacle-contact determination may be, for example, implemented by a method as shown in Published Japanese Patent Application No. 2005-96725. Specifically, if the absolute value θtsa of the deviation between desired road wheel steer angle θta and actual road wheel steer angle θt is larger than or equal to a threshold value θa determined in consideration of a delay due to the communication between steering-feedback controller 10 and steering-output controller 16, a response delay to a command, and an accuracy of the road wheel steer angle control, if a period of time that actual road wheel steer angle θt is held at a previous value is longer than or equal a threshold period of time Tit (for example, actual road wheel steer angle θt is held within a variation of less than ±1 degree over 1 second), and if a period of time that actual steering-motor driving current It is longer than or equal to a threshold current Itt continues over a predetermined period of time Tt, steering-output controller 16 determines that steerable road wheels 4, 5 are in contact with an obstacle.

At step S3, steering-output controller 16 sets desired road wheel steer angle θta to actual road wheel steer angle θt, based on the determination at step S2 that steerable road wheels 4, 5 are in contact with an obstacle. Subsequently, the routine returns to step S1.

At step S4, steering-output controller 16 computes actual vehicle slip angle β of the vehicle using the following equation, based on the determination at step S2 that steerable road wheels 4, 5 are in contact with no obstacle.

$$\beta = \int \{(YG/V) - \psi\} dt \quad (1)$$

where YG is the lateral acceleration, V is the vehicle speed, and ψ is the yaw rate. Subsequently, the routine proceeds to step S5.

At step S5, steering-output controller 16 computes desired vehicle slip angle β* in accordance with vehicle speed V and desired road wheel steer angle θta (in accordance with actual steering wheel angle θs). Subsequently, the routine proceeds to step S6.

At step S6, steering-output controller 16 computes vehicle slip angle deviation Δβ by subtracting actual vehicle slip angle β from desired vehicle slip angle β*. Subsequently, the routine proceeds to step S7.

At step S7, steering-output controller 16 determines a limit value for limiting the disturbance compensation, in accordance with vehicle slip angle deviation Δβ and a predetermined gain Kcs. Gain Kcs is predetermined in accordance with the vehicle characteristics. Specifically, first, the limit value is set to decrease with an increase in vehicle slip angle deviation Δβ. Second, the limit value is multiplied by gain Kcs to obtain a final limit value for limiting the disturbance compensation. Subsequently, the routine returns to step S1. Accordingly, when slip angle deviation Δβ does not occur, the disturbance compensation of robust compensator 16b is not limited at disturbance compensation limiter 16c so that motor current command Ita is computed to be large with full disturbance compensation. On the other hand, when slip angle deviation Δβ occurs, the disturbance compensation of robust compensator 16b is limited by disturbance compensation limiter 16c so that motor current command Ita is computed to be smaller than in case of no slip angle deviation. Furthermore, since the limitation of disturbance compensation limiter 16c is enhanced with an increase in slip angle deviation Δβ, that is, since the disturbance compensation is limited with a limit value decreasing with an increase in slip angle deviation Δβ, motor current command Ita is computed to decrease with an increase in slip angle deviation Δβ. Gain Kcs is set to increase with an increase in the stiffness of vehicle body. For example, the gain Kcs of a sports-type car with a high vehicle body stiffness is set larger than a sedan-type car.

Figure 17:
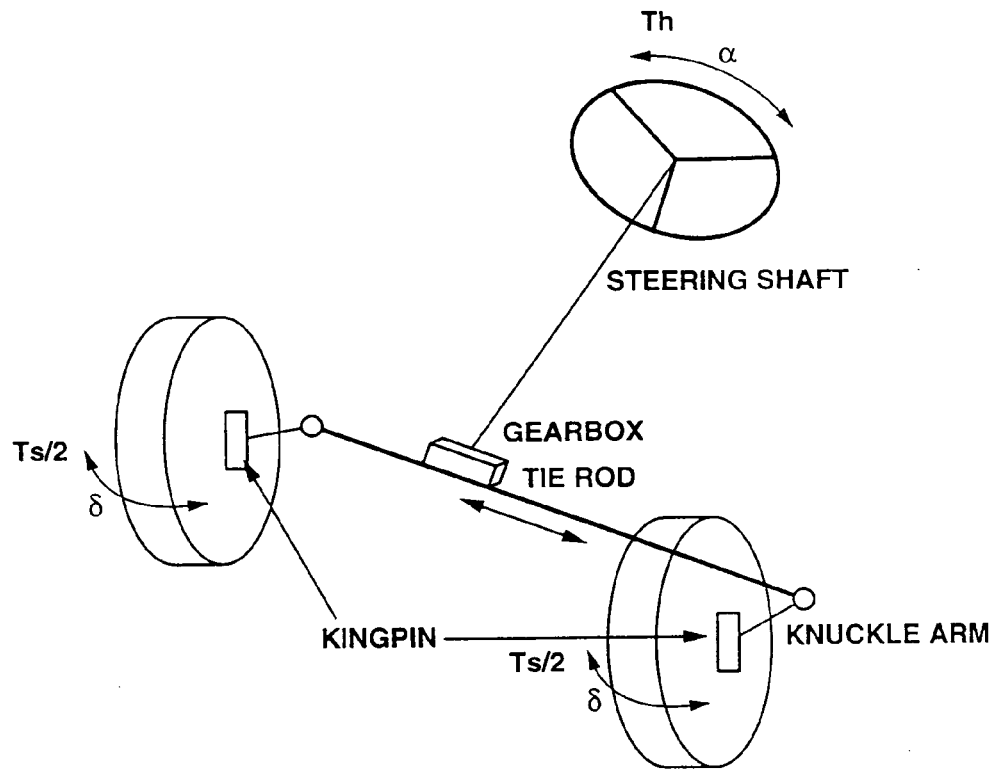
FIG. 17 is a schematic diagram showing a steering system where a steering wheel is mechanically connected to steered road wheels.
Figure 18:
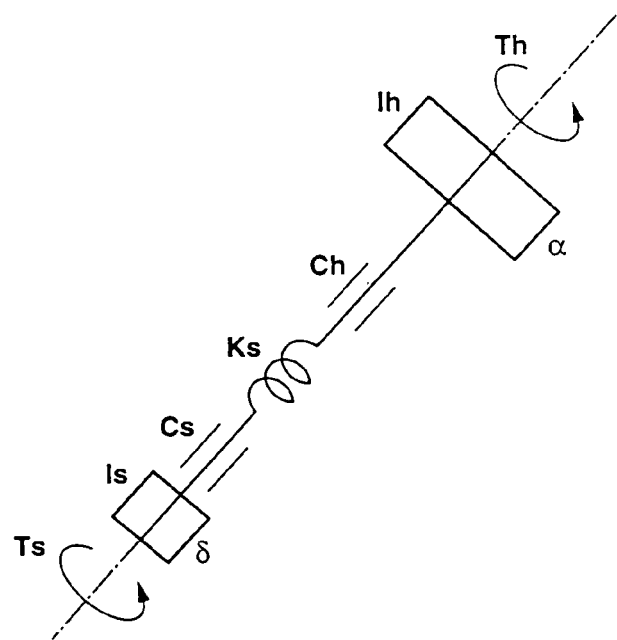
FIG. 18 is a schematic diagram showing a steering shaft in the steering system of FIG. 17.

Referring now to FIGS. 17 and 18, the following discusses torsion between steering-input section and steering-output section. FIG. 17 is a schematic diagram showing a reference steering system where a steering wheel is mechanically connected to steered road wheels.

FIG. 18 is a schematic diagram showing a steering shaft in the reference steering system of FIG. 17. The equation of motion of the reference steering system is expressed by the following equations. The equation (1) describes an equivalent equation converted with respect to the kingpin from an equation of rotational motion of the steering wheel. The equations (2) and (3) describes an equivalent equation of rotational motion of the steered wheels with respect to the kingpin.

$$Ih \cdot (d^2\alpha/dt^2) + Ch \cdot (d\alpha/dt) + Ks \cdot (\alpha - \delta) = Th \quad (1)$$

$$Ts = (\epsilon n + \epsilon c) \cdot Kf \cdot \{\beta + (lf/V) \cdot \gamma - \delta\} \quad (2)$$

$$Is \cdot (d^2\delta/dt^2) + Cs \cdot (d\delta/dt) + Ks \cdot (\delta - \alpha) = Ts \quad (3)$$

where:
Ih: converted moment of inertia of the steering wheel about the kingpin,
Ch: viscous coefficient of friction of the steering shaft,
Ks: coefficient of elasticity about the kingpin,
δ: steering wheel angle,
α: converted angular position of the steering wheel about the kingpin,
Th: driver's steering torque,
Is: moment of inertia of the steered wheels about the kingpin,
Cs: viscous coefficient of friction about the kingpin,
Kf: cornering power,
Ts: moment of force about the kingpin,
lf: distance between vehicle center of mass and front axle,
β: vehicle slip angle,
εn: pneumatic trail,
εc: caster trail,
V: vehicle speed, and
γ: vehicle yaw rate.

As shown above, Ts in the equations (2) and (3) is applied as an external force to the steering system, so that a steady-state deviation occurs between the steering wheel angle (converted) and the road wheel steer angle by the torsion due to Ts. For example, in the equation (1), when the steering wheel is turned from δ=0, Ks·(α−δ) is generated balancing with torque Th, which represents a torsion is generated between the steering wheel angle (converted) and the road wheel steer angle. On the other hand, in the equations (2) and (3), when the steering wheel is at δ≠0, Ks·(δ−α) is generated balancing with Ts, which represents a torsion is generated between the steering wheel angle (converted) and the road wheel steer angle.

The following describes a reference technique of steer-by-wire. Published Japanese Patent Application No. 10-310074 shows a steer-by-wire device configured to control steering operation in accordance with a deviation between a desired road wheel steer angle and an actual road wheel steer angle, and in accordance with a steering load, and specifically configured to control steering operation by determining the amount of a controlled variable of steering in such a manner as to regulate the deviation between the desired road wheel steer angle and the actual road wheel steer angle to zero. Accordingly, trackability of the road wheel steer angle command to the desired road wheel steer angle is high. Hence, the reference device does not simulate with sufficient accuracy a natural torsion of the steering-output section, and a steering-feedback to disturbance or external forces applied to the steering-output section. Since the corresponding amount of the disturbance compensation is generated with no simulation of the torsion between the steering-input section and the steering-output section, the actual road wheel steer angle is constantly in agreement to the desired road wheel steer angle. This configuration is equivalent to a vehicle of a very high steering stiffness. In general, on a curved road, a driver turns a steering wheel deeply first to obtain a suitable amount of the vehicle yaw rate at start of cornering, and then returns the steering wheel and adjusts the steering wheel to control the trajectory of the vehicle to fit along the curved road. However, such a vehicle with a steer-by-wire device, which is equivalent to a vehicle of a very high steering stiffness, tends to oversteer in case the steering wheel is largely turned on a curved road, since the actual road wheel steer angle is regulated with high response to the steering wheel angle. Accordingly, it is possible that on a curved road, the reference steering device excessively increases the vehicle slip angle to adversely affect the stability of the vehicle cornering behavior. On the other hand, when an external force is added to a steerable road wheel on a bumpy road, a wavy road, or a rutted road, such a vehicle with a steer-by-wire device, which is equivalent to a vehicle of a very high steering stiffness, controls a steering-output actuator to resist the external force to a steerable road wheel to hold the actual road wheel steer angle of a steerable road wheel as desired. In such a case when an external force is added to a steerable road wheel, it is possible that the response force or shock is transmitted from the steering-output actuator to the vehicle body as it is, to adversely affect comfortability of the vehicle. Furthermore, such a vehicle with a steer-by-wire device, which is equivalent to a vehicle of a very high steering stiffness, has a characteristic of quick response of the steerable road wheel to the steering wheel to generate the vehicle yaw rate with little delay, which is different from that of a mechanical steering system including a steering wheel and a steerable road wheel connected mechanically to each other, to give a driver sense of incongruity, and to adversely affect the feeling of steering. In addition, when a large external force is input to a steerable road wheel, the reference steering device apply a large amount of current abruptly to the steering-output actuator to overcome the external force, which results in that the motor of the steering-output actuator is highly loaded to be in an overheating condition.

The following describes steering-output control operations of the steering apparatus of the first embodiment when an external force is applied to the steerable road wheels. In the steering apparatus of the first embodiment, steering-output controller 16 adjusts motor current command Ita to the electric motor of steering-output actuator 6 to decrease with an increase in slip angle deviation Δβ, in order to intentionally generate a steady-state deviation between desired road wheel steer angle θta and actual road wheel steer angle θt. Accordingly, when the vehicle is traveling with steerable road wheels 4 and 5 being input with an external force, a desired torsion between the steering-input section and the steering-output section is simulated with sufficient accuracy by the road wheel steer angle deviation, to secure the stability of the vehicle cornering behavior, to improve the comfortability of the vehicle, and to improve the feeling of steering. Specifically, when the vehicle is traveling on a curved road, a bumpy road, a wavy road, or a rutted road, with steerable road wheels 4 and 5 being contact with no obstacle, the routine proceeds in order of steps S1, S2, S4, S5, S6, and S7, in the flow chart of FIG. 6. At step S7, the limit value for limiting the disturbance compensation output from robust compensator 16b is set to decrease with an increase in slip angle deviation $\Delta\beta$, and the set limit value is multiplied by gain Kcs to obtain the final limit value for is limiting the disturbance compensation output from robust compensator 16b.

The following describes how slip angle deviation $\Delta\beta$ serves as an external force indicator in the first embodiment. For example, when the vehicle is traveling straight and steerable road wheels 4 and 5 are turned by an external force from a bumpy road, actual vehicle slip angle $\beta$ is generated in accordance with generation of lateral acceleration YG and vehicle yaw rate $\psi$ although desired vehicle slip angle $\beta^*$ is zero (refer to the equation (1)). Therefore, in case slip angle deviation $\Delta\beta$ arises during the vehicle traveling straight, slip angle deviation $\Delta\beta$ is considered as an external force indicator. On the other hand, when slip angle deviation $\Delta\beta$ arises during cornering, it means that the vehicle is out of neutral steer conditions where desired vehicle slip angle $\beta^*$ is identical to actual vehicle slip angle $\beta$. Accordingly, slip angle deviation $\Delta\beta$, which is a part of the lateral force added to steerable road wheels 4 and 5 that produces the amount of oversteer or the amount of understeer with respect to the neutral steer state, serves as an external force indicator. Therefore, by using slip angle deviation $\Delta\beta$ as an external force indicator, the steering apparatus of the first embodiment detect with sufficient accuracy influences of an external force on the vehicle dynamic behavior during driving on various roads including a curved road. Thus, the steering apparatus of the first embodiment that intentionally generates a steady-state deviation between desired road wheel steer angle $\theta$ta and actual road wheel steer angle $\theta$t by limiting the output of the disturbance 15 compensator in accordance with slip angle deviation $\Delta\beta$, is effective for simulating with sufficient accuracy a natural torsion between the steering-input section and the steering-output section of a vehicle provided with a typical steering device mechanically connected a steering wheel and a steerable road wheel.

Figure 7:
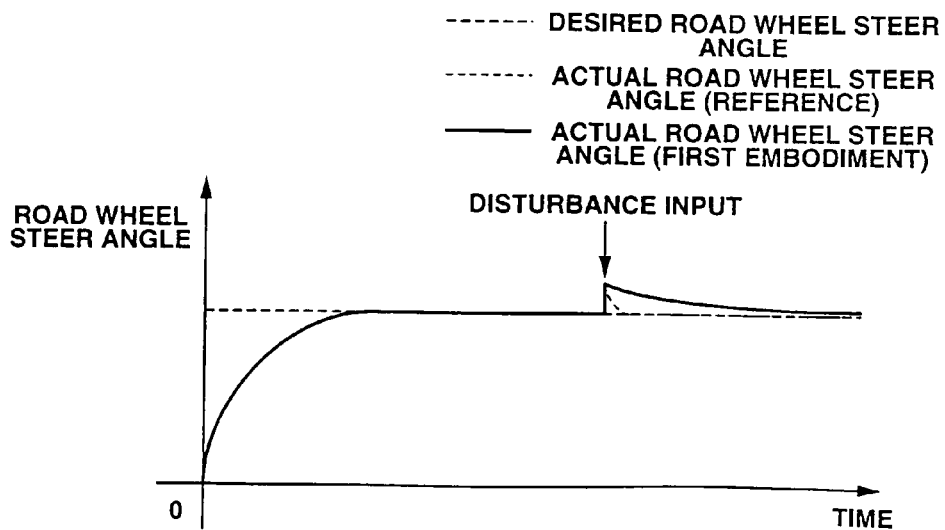
FIG. 7 is a view illustrating a sample response of an actual road wheel steer angle in accordance with the first embodiment and a response of an actual road wheel steer angle in accordance with a reference embodiment, with respect to a desired road wheel steer angle, where a disturbance is input to a steered road wheel.

FIG. 7 is a view illustrating a sample response of an actual road wheel steer angle in accordance with the first embodiment and a response of an actual road wheel steer angle in accordance with a reference embodiment, with respect to a desired road wheel steer angle, where an external force (disturbance) is input to a steerable road wheel. As indicated by the dotted lines, the steering device of the reference embodiment performs full disturbance compensation for disturbance, so that with a disturbance input, the actual road wheel steer angle is regulated in agreement with desired road wheel steer angle with sufficiently quick response. On the other hand, in the first embodiment, as indicated by the solid lines, when a disturbance is input, the steering apparatus limits the disturbance compensation in order to simulate the steering torsion to the disturbance input so that actual road wheel steer angle $\theta$t is apart from desired road wheel steer angle $\theta$ta, with the limit value of disturbance compensation limiter 16c being zero. After the disturbance input, model-matching compensator 16a computes motor current command Ita so as to regulate actual road wheel steer angle $\theta$t to desired road wheel steer angle $\theta$ta, and disturbance compensation limiter 16c gradually relieves the limitation of the disturbance compensation. Thus, actual road wheel steer angle $\theta$t gradually converges to desired road wheel steer angle $\theta$ta with a response delay.

When steering wheel 1 is deeply turned on a curved road, a deviation occurs between motor current command Ita and actual road wheel steer angle $\theta$t. At the beginning of cornering, robust compensator 16b outputs a disturbance compensation, with the deviation serving as a disturbance. On the other hand, since slip angle deviation $\Delta\beta$ occurs at the beginning of cornering, steering-output controller 16 limits the output of the disturbance compensation. As a result, on a curved road, actual road wheel steer angle $\theta$t gradually converges to desired road wheel steer angle $\theta$ta with a response delay, so that the vehicle has no oversteer tendency like a vehicle with a very high steering stiffness. Therefore, on a curved road, the steering apparatus of the first embodiment prevents an excessive increase in the vehicle slip angle and secures the stability of vehicle cornering behavior.

When an external force is applied to steerable road wheels 4 and 5 on a bumpy road, a wavy road, or a rutted road, a deviation occurs between motor current command Ita and actual road wheel steer angle $\theta$t. Robust compensator 16b outputs a disturbance compensation, with the deviation serving as a disturbance. On the other hand, when the external force is applied to steerable road wheels 4 and 5 on a bumpy road, the directions of steerable road wheels 4 and 5 change from their neutral positions to produce slip angle deviation $\Delta\beta$ of the vehicle. Accordingly, steering-output controller 16 limits the output of the disturbance compensation. As a result, when the actual road wheel steer angle of steerable road wheels 4 and 5 is instantaneously changed by external forces on a bumpy road, a wavy road, or a rutted road, the response-force applied to steering-output actuator 6 is not transmitted to the vehicle body as it is like a vehicle equivalent to a vehicle with a very high steering stiffness. This improves the comfortability of the vehicle.

In case the steering apparatus of the first embodiment performs a control operation of limiting the output of disturbance compensation from robust compensator 16b, the steering stiffness becomes substantially equivalent to that of a vehicle carrying a steering gear mechanically connecting a steering wheel and a steerable road wheel. Accordingly, the vehicle response to the steering operation is natural, for example, the steerable road wheel is actually steered to generate a yaw rate with some response delay with respect to operation of the steering wheel. Thus, the steering apparatus of the first embodiment cancels the sense of incongruity of a driver as in a vehicle equivalent to a vehicle whose steering stiffness is very high, and provides a desired feeling of steering. When a deviation occurs between desired road wheel steer angle $\theta$ta and actual road wheel steer angle $\theta$t, so that a driver feels that actual road wheel steer angle $\theta$t is relatively small, the driver may further turn the steering wheel 1 to increase actual road wheel steer angle $\theta$t accordingly.

In addition, when a large external force is input to steerable road wheels 4 and 5, the control operation of limiting the output of disturbance compensation from robust compensator 16b makes the change of motor current command Ita mild. When a large external force is input, a large current is not abruptly generated in the steering-output section, to secure the steer angle of a steerable road wheel. Accordingly, the steering apparatus reduces the motor load of steering-output actuator 6, and prevents it from an overheating condition.

The following describes steering-output control operations of the steering apparatus of the first embodiment when steerable road wheels 4 and 5 are in contact with an obstacle. When steerable road wheels 4 and 5 are in contact with an obstacle, the routine proceeds in order of steps S1, S2, and S3, in the flow chart of FIG. 6. At step S3, desired road wheel steer angle θta is set to actual road wheel steer angle θt, in other words, the deviation between desired road wheel steer angle θta and actual road wheel steer angle θt is set to zero. Thus, the current command to the steering-output section motor is not set to a value equivalent to desired road wheel steer angle θta in the steering-output section according to actual steering wheel angle θs as usual, but set to a value in such a manner that the deviation between desired road wheel steer angle θta and actual road wheel steer angle θt is zero. With this setting, even when a driver further turns steering wheel 1, the steering-output section no longer moves. Accordingly, the amount of the motor current to cancel the deviation between desired road wheel steer angle θta and actual road wheel steer angle θt is unnecessary. Only the amount of the motor current to hold road wheel steer angle θt in the present position is enough. Therefore, the steering apparatus of the first embodiment limits the current to the motor, to protect the motor against overheating. In addition, when steerable road wheels 4 and 5 are in contact with an obstacle, desired road wheel steer angle θta in the steering-output section is changed without directly changing the current command to the steering-output section motor to a certain value. Accordingly, the control mode is smoothly shifted again from the control for obstacle-contact conditions to the usual road wheel steer angle control.

The following describes steering-feedback control operations of the steering apparatus of the first embodiment when an external force is applied to the steerable road wheels. While the steering apparatus of the first embodiment intentionally generates a steady-state deviation between desired road wheel steer angle θta and actual road wheel steer angle θt by limiting the output of a disturbance compensator in accordance with slip angle deviation Δβ as mentioned above, the steering apparatus of the first embodiment generates a steering feedback to steering wheel 1 in accordance with the deviation between desired road wheel steer angle θta and actual road wheel steer angle θt, as shown in FIG. 3. When the external force is applied to steerable road wheels 4 and 5, a deviation is produced between desired road wheel steer angle θta and actual road wheel steer angle θt. The steering feedback changes with respect to a state with no external force, in accordance with the deviation, which informs a driver of that an external force is applied to steerable road wheels 4 and 5. As shown in FIG. 3, the steering feedback control of the first embodiment prevents an excessive amount of steering feedback possible to obstruct turning steering wheel 1, when actual steering wheel angle θs and steering wheel angle rate ωs (=dθs/dt) increases large. The characteristic of steering feedback is set in accordance with the vehicle characteristic. Limit value Ls is set so as to increase with an increase in estimated tire-road friction coefficient μ. This is effective for providing a suitable amount of steering feedback in accordance with the estimated tire-road friction coefficient μ, that is, for preventing an excessive amount of steering feedback possible to obstruct turning steering wheel 1 on a low μ road, or allowing a relatively large amount of steering feedback on a high μ road.

The following describes effects and advantages of the steering apparatus of the first embodiment ((A1)–(A6)).

(A1) A steering apparatus for a steerable vehicle, including: a steering actuator (6) configured to generate a steering effort to regulate a steering output (θt) of the vehicle, in accordance with a steering effort command (Ita); a steering input unit (1, 8) configured to set a steering input (θs); a disturbance determination section (18) configured to determine a disturbance indicator (Δβ) indicative of a disturbance input to the vehicle; and a steering controller (16) connected for signal communication to the steering actuator (6), the steering input unit (1, 8), and the disturbance determination section (18), and configured to perform the following: setting a desired steering output (θta) in accordance with the steering input (θs); setting the steering effort command (Ita) in accordance with the desired steering output (θta); adjusting the steering effort command (Ita) in accordance with the disturbance indicator (Δβ); and outputting the adjusted steering effort command (Ita) to the steering actuator (6), wherein the steering controller (16) is configured to adjust the steering effort command (Ita) to decrease with an increase in the disturbance indicator (Δβ), wherein the vehicle is a wheeled vehicle, wherein the steering actuator (6) is configured to generate a steering effort to regulate a steer angle of a road wheel (4, 5) of the vehicle, in accordance with the steering effort command (Ita), and wherein the steering input unit (1, 8) is a steering wheel configured to set a steering wheel angle as the steering input (θs), is effective for simulating with sufficient accuracy a desired torsion between the steering-input section and the steering-output section when the vehicle is traveling with steerable road wheels 4 and 5 being input with an external force, to secure the stability of the vehicle cornering behavior, to improve the comfortability of the vehicle, and to improve the feeling of steering.

(A2) The steering apparatus wherein the steering controller (16) is configured to adjust the steering effort command (Ita) to increase with an increase in a mechanical part of steering stiffness of the vehicle, is effective for simulating with sufficient accuracy a torsion between the steering-input section and the steering-output section in accordance with a desired steering stiffness of a vehicle (a sports-type car, a sedan-type car, etc.).

(A3) The steering apparatus further including a steering output sensor (15) configured to measure the steering output (θt), wherein the steering controller (16) is configured to perform the following: determining whether or not the road wheel (4, 5) is in contact with an obstacle; and setting the desired steering output (θta) to the measured steering output (θt), and inhibiting the adjusting the steering effort command (Ita), when it is determined that the road wheel (4, 5) is in contact with an obstacle, is effective for limiting the current to the motor, to protect the motor against overheating, and effective for smoothly shifting the control mode from the control for obstacle-contact conditions to the usual road wheel steer angle control, because of changing desired road wheel steer angle θta without directly changing the current command to the steering-output section motor, when steerable road wheels 4 and 5 are in contact with an obstacle.

(A4) The steering apparatus further including a steering output sensor (15) configured to measure the steering output (θt), wherein the steering controller (16) is configured to set the steering effort command (Ita) in accordance with the desired steering output (θta) and the measured steering output (θt), further including: a feedback actuator (2) configured to generate a steering feedback to the steering input unit (1, 8) in accordance with a steering-feedback command (Tms); and a feedback controller (10) configured to set the steering-feedback command (Tms) in accordance with a difference between the desired steering output (θta) and the measured steering output (θt), is effective for informing a driver of that an external force is applied to steerable road wheels 4 and 5, when the motor drive torque is controlled in accordance with the external force applied to steerable road wheels 4 and 5 to produce a deviation between desired road wheel steer angle θta and actual road wheel steer angle θt.

(A5) The steering apparatus wherein the disturbance determination section (19) is configured to determine a difference between a desired vehicle slip angle (β*) of the vehicle and an actual vehicle slip angle of the vehicle, as the disturbance indicator (Δβ), is effective for measuring with sufficient accuracy external forces to steerable road wheels 4 and 5 which affect the vehicle dynamic behavior, such as cornering behavior, and deflection of the vehicle body due to road surface disturbance.

(A6) The steering apparatus further including a steering output sensor (15) configured to measure the steering output (θt), wherein the steering controller (16) is configured to set the steering effort command (Ita) in accordance with the desired steering output (θta) and the measured steering output (θt), wherein the steering controller (16) includes a disturbance compensator (16b) configured to determine a disturbance compensation in accordance with the steering effort command (Ita) and the measured steering output (θt), and wherein the steering controller (16) is configured to adjust the disturbance compensation to decrease with an increase in the disturbance indicator (Δβ; Tf) for the adjusting the steering effort command (Ita), is effective for allowing simply constructing a control system of intentionally generating a steady-state deviation between desired road wheel steer angle θta and actual road wheel steer angle θt in accordance with an external force indicator, by adding disturbance compensation limiter 16c of limiting the output of disturbance compensation in accordance with an external force indicator, to steering-output controller 16 including robust compensator 16b.

Figure 8:
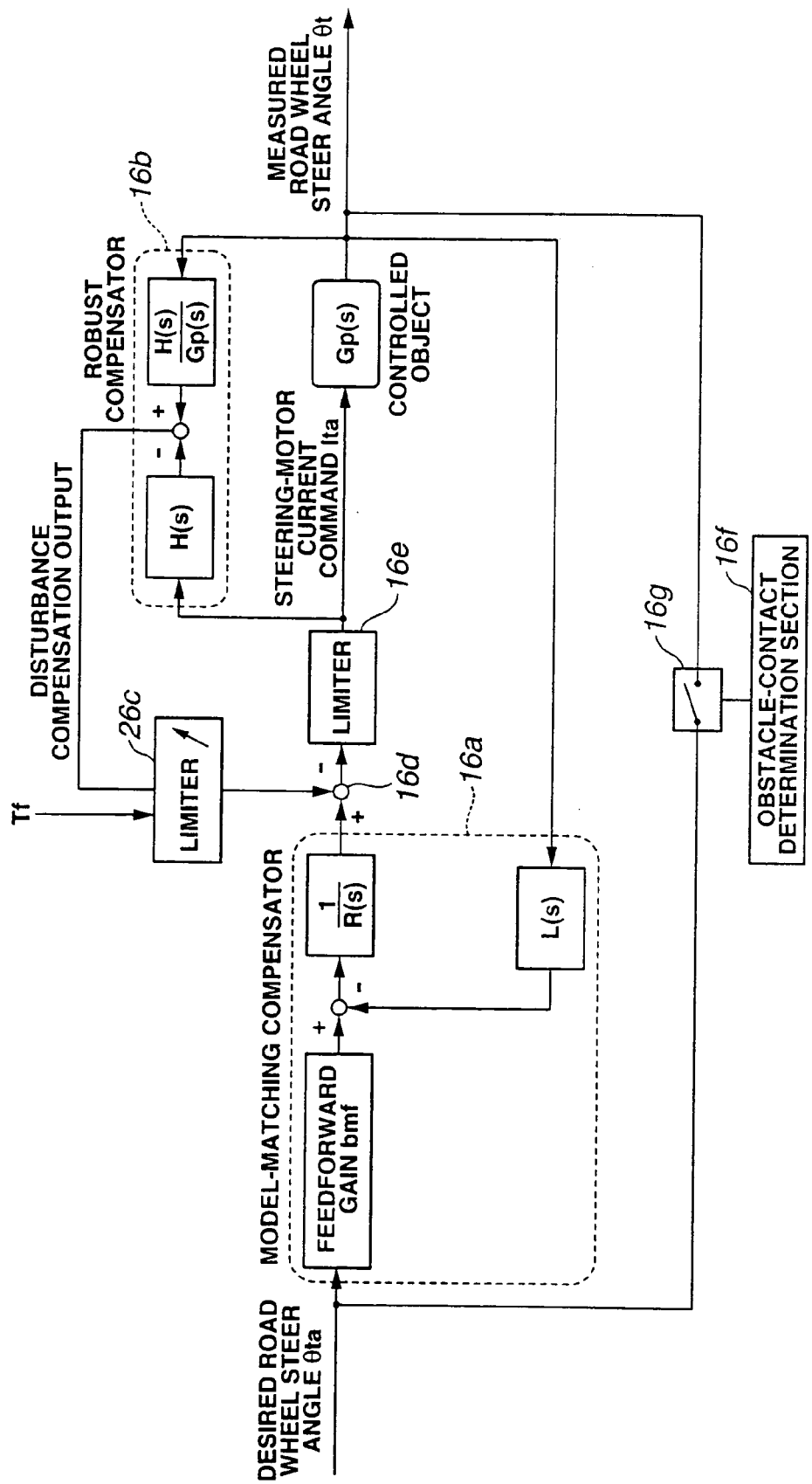
FIG. 8 is a system block diagram showing a steering-output control system constructed with a robust model matching technique in accordance with a second embodiment.
Figure 9:
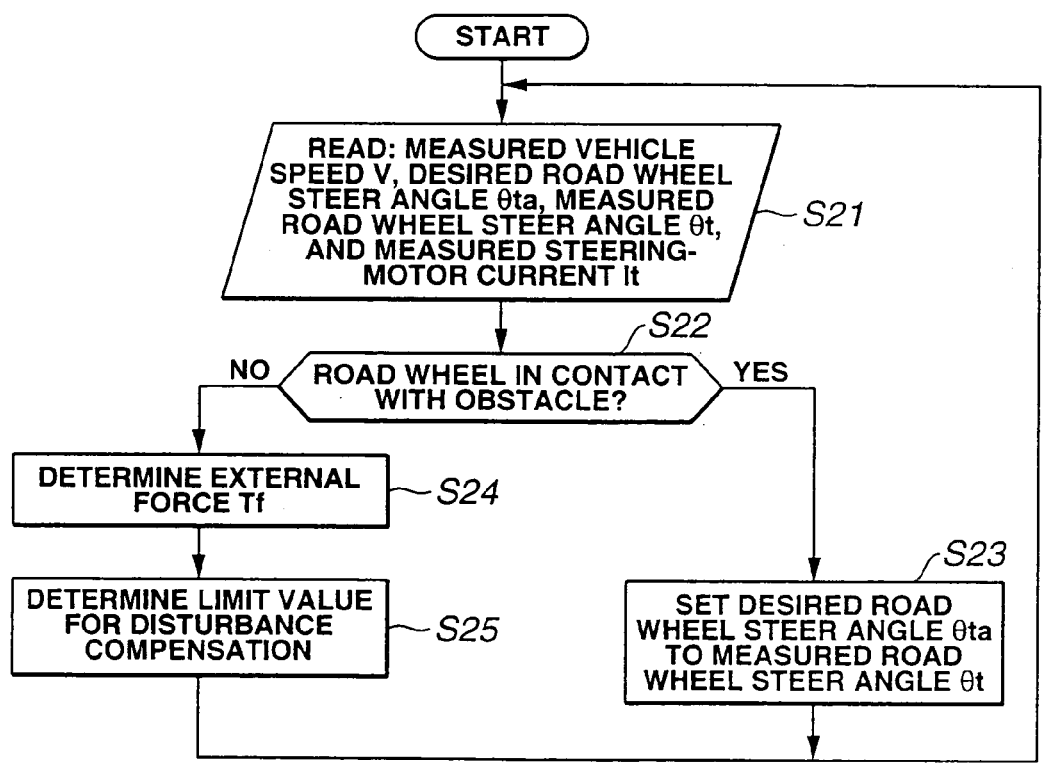
FIG. 9 is a flow chart showing a steering-output control processing to be performed by a steering-output controller of the steering apparatus of the second embodiment.

Referring now to FIGS. 8 and 9, there is shown a steering apparatus for a steerable vehicle in accordance with a second embodiment. In the second embodiment, the steering apparatus detects an axial force for steering steerable road wheels 4 and 5, as an external force indicator. FIG. 8 is a system block diagram showing a steering-output control system constructed with a robust model matching technique in accordance with the second embodiment. As shown in FIG. 8, steering-output controller 16 includes model-matching compensator 16a, robust compensator or disturbance compensator 16b, subtracter 16d, current limiter 16e, obstacle-contact determination section 16f, switch 16g, and a disturbance compensation limiter 26c. Thus, disturbance compensation limiter 16c of the first embodiment is replaced with disturbance compensation limiter 26c, in the second embodiment. In the second embodiment, external force sensor 19 serves as a disturbance determination section configured to determine a disturbance indicator indicative of a disturbance input to the vehicle.

Disturbance compensation limiter 26c is configured to limit the disturbance compensation from robust compensator 16b so that the disturbance compensation from robust compensator 16b decreases with an increase in an external force indicator indicative of an external force applied to steerable road wheels 4, 5, which is an axial force Tf applied to steerable road wheels 4, 5.

The following describes steering-output control operations of the steering apparatus of the second embodiment. FIG. 9 is a flow chart showing a steering-output control processing to be performed by steering-output controller 16. Steps S21, S22, and S23 in the flow chart of FIG. 9 are same as steps S1, S2, and S3 in the flow chart of FIG. 6, respectively.

Following the determination at step S22 that steerable road wheels 4, 5 are in contact with no obstacle, at step S24, steering-output controller 16 computes external force Tf applied to steerable road wheels 4 and 5 in accordance with the sensor signal from external force sensor 19. Subsequently, the routine proceeds to step S25.

At step S25, steering-output controller 16 determines a limit value for limiting the disturbance compensation, in accordance with external force Tf and a predetermined gain Kcs. Gain Kcs is predetermined in accordance with the vehicle characteristics. Specifically, first, the limit value is set to decrease with an increase in external force Tf. Second, the limit value is multiplied by gain Kcs to obtain a final limit value for limiting the disturbance compensation. Subsequently, the routine returns to step S1. Accordingly, when external force Tf does not occur, the disturbance compensation of robust compensator 16b is not limited at disturbance compensation limiter 26c so that motor current command Ita is computed to be large with full disturbance compensation. On the other hand, when external force Tf occurs, the disturbance compensation of robust compensator 16b is limited by disturbance compensation limiter 26c so that motor current command Ita is computed to be smaller than in case of no external force. Furthermore, since the limitation of disturbance compensation limiter 26c is enhanced with an increase in external force Tf, that is, since the disturbance compensation is reduced with an increase in external force Tf, motor current command Ita is computed to decrease with an increase in external force Tf. Gain Kcs is set to increase with an increase in the stiffness of vehicle body or a desired steering stiffness. For example, the gain Kcs of a sports-type car with a high steering stiffness is set larger than a sedan-type car.

The following describes steering-output control operations of the steering apparatus of the second embodiment when an external force is applied to the steerable road wheels. In the steering apparatus of the second embodiment, steering-output controller 16 adjusts motor current command Ita to the electric motor of steering-output actuator 6 to decrease with an increase in external force Tf, in order to intentionally generate a steady-state deviation between desired road wheel steer angle θta and actual road wheel steer angle θt. Accordingly, when the vehicle is traveling with steerable road wheels 4 and 5 being input with an external force, a desired torsion between the steering-input section and the steering-output section is simulated with sufficient accuracy by the road wheel steer angle deviation, to secure the stability of the vehicle cornering behavior, to improve the comfortability of the vehicle, and to improve the feeling of steering. Specifically, when the vehicle is traveling on a curved road, a bumpy road, a wavy road, or a rutted road, with steerable road wheels 4 and 5 being in contact with no obstacle, the routine proceeds in order of steps S21, S22, S24, and S25, in the flow chart of FIG. 9. At step S25, the limit value for limiting the disturbance compensation output from robust compensator 16b is set to decrease with an increase in external force Tf, and the set limit value is multiplied by gain Kcs to obtain the final limit value for limiting the disturbance compensation output from robust compensator 16b.

The following describes the reason for using external force Tf as an external force indicator in the second embodiment. First, a vehicle equipped with a torque sensor at a steering rack shaft may use the torque sensor data as it is. Second, since the steering-output control of the second embodiment is an angle control of controlling motor current command Ita which is a motor torque command to the motor, i.e., controlling the torque applied to the motor according to an external force indicator, using directly a quantity of torque as an external force indicator allows a quick and effective response in the steering-output control.

The following describes effects and advantages of the steering apparatus of the second embodiment. In the second embodiment, the steering apparatus produces the following effects and advantages (A7) in addition to (A1)–(A6) of the first embodiment.

(A7) The steering apparatus wherein the disturbance determination section (19) is configured to measure the steering effort as the disturbance indicator (Tf), is effective for acquiring a relatively accurate external force indicator, and for performing a quick and effective adjustment control of motor current command Ita.

Figure 10:
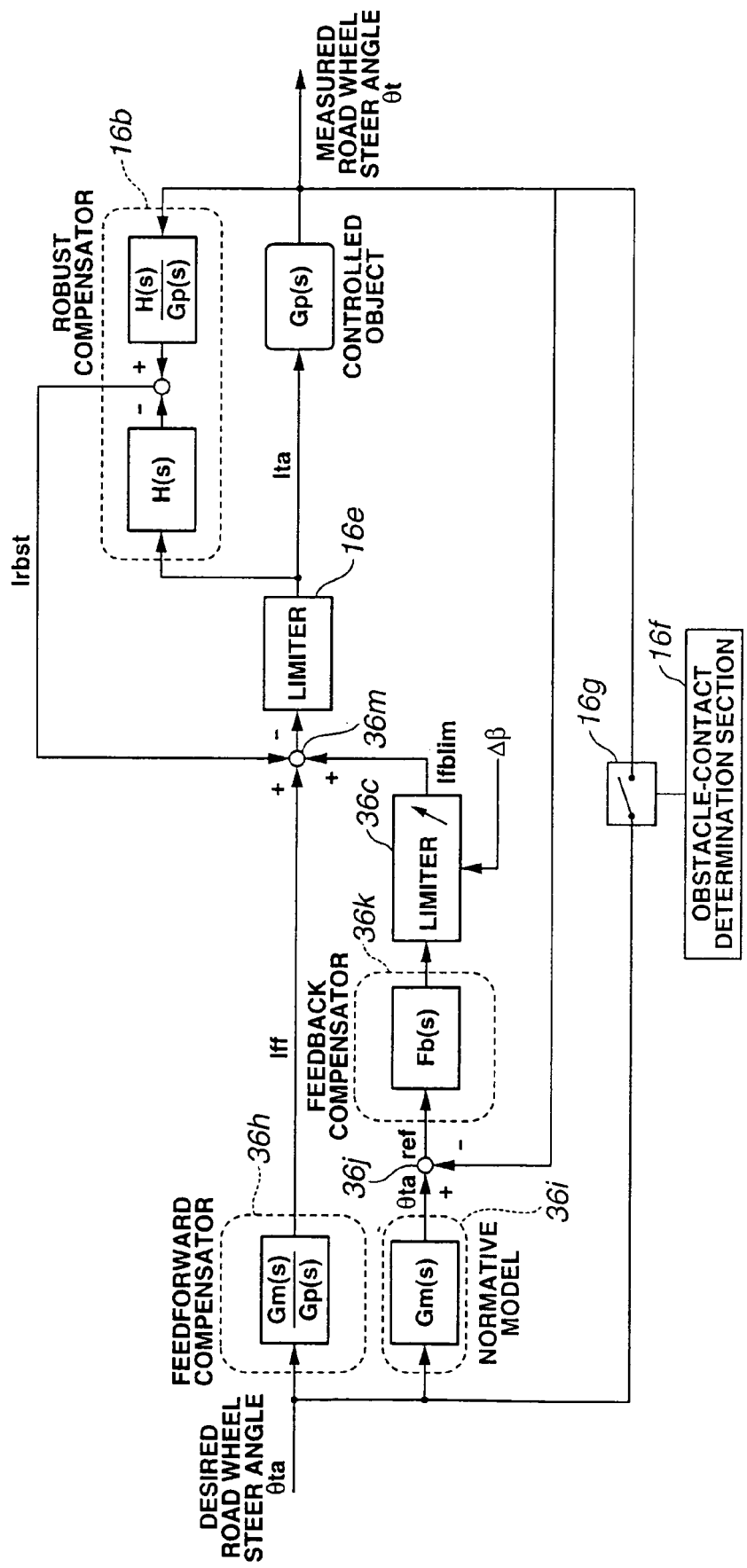
FIG. 10 is a system block diagram showing a steering-output control system with a two-degree-of-freedom control including a feedforward compensator and a feedback compensator in accordance with a first variation of a third embodiment.
Figure 11:
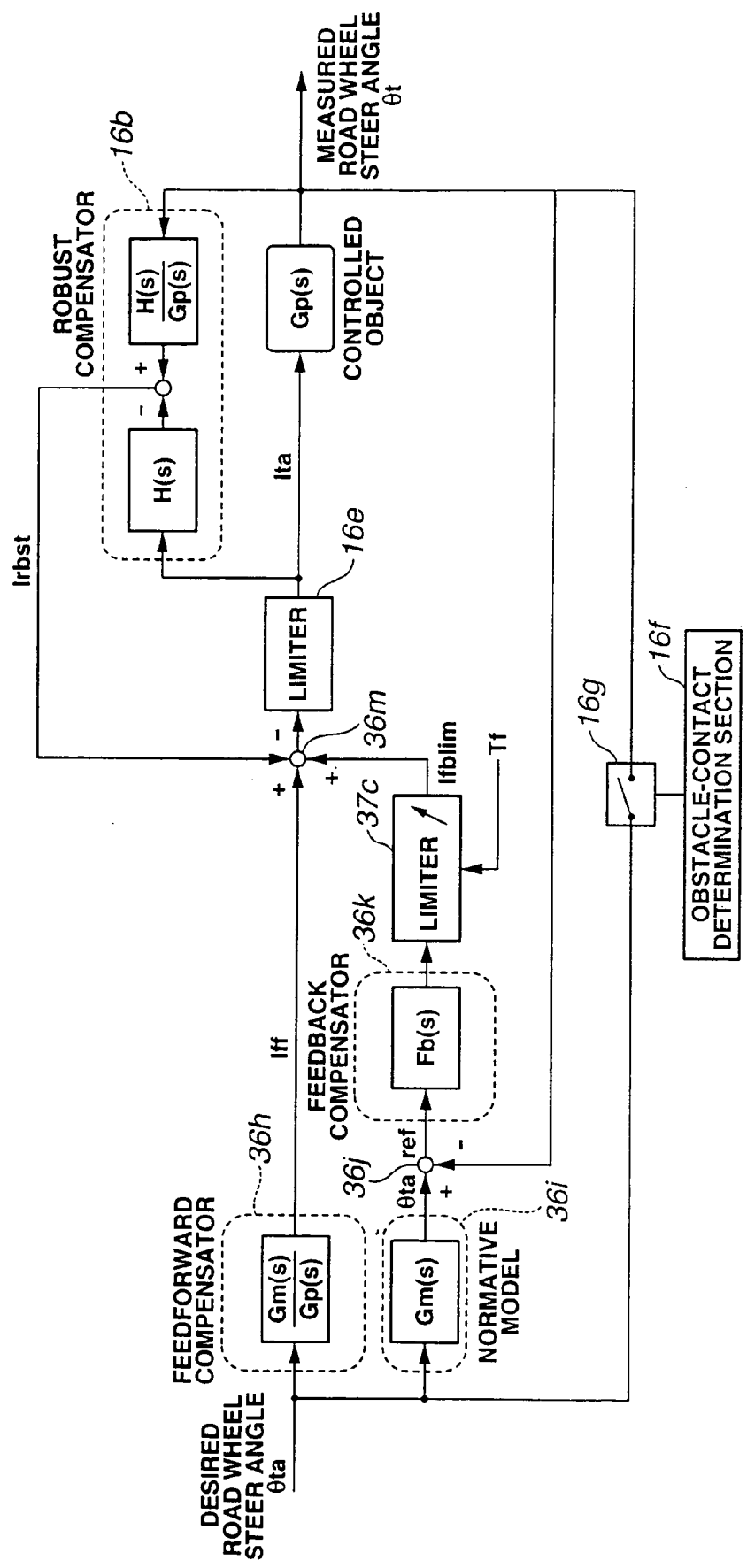
FIG. 11 is a system block diagram showing a steering-output control system with a two-degree-of-freedom control including a feedforward compensator and a feedback compensator in accordance with a second variation of the third embodiment.

Referring now to FIGS. 10 and 11, there is shown a steering apparatus for a steerable vehicle in accordance with a third embodiment. In the third embodiment, the steering-output section is configured to be a two-degree-of-freedom control system including a feedforward compensator and a feedback compensator, and configured to limit the output from the feedback compensator. FIG. 10 is a system block diagram showing a steering-output control system in accordance with a first variation of the third embodiment. FIG. 11 is a system block diagram showing a steering-output control system in accordance with a second variation of the third embodiment. As shown in FIGS. 10 and 11, steering-output controller 16 includes robust compensator 16b, current limiter 16e, obstacle-contact determination section 16f, switch 16g, a feedforward compensator 36h, a normative model 36i, a totalizer 36j, a feedback compensator 36k, and a feedback compensation limiter 36c, or 37c.

Feedforward compensator 36h is configured to receive desired road wheel steer angle θta, and to output a feedforward steering-motor current command (feedforward steering effort command) Iff as a feedforward part of the steering-motor current command to totalizer 36m.

Normative model 36i is configured to receive desired road wheel steer angle θta, and to generate a normative road wheel steer angle or reference road wheel steer angle θta_ref by means of a normative model Gm(s).

Subtracter 36j is configured to compute a deviation between reference road wheel steer angle θta_ref output from normative model 36i and actual-road wheel steer angle θt.

Feedback compensator 36k is configured to receive the road wheel steer angle deviation from subtracter 36j, and to output a steering-motor current command feedback compensation (steady-state-disturbance compensation) Ifb as a feedback compensation to the steering-motor current command to feedback compensation limiter 36c or 37c.

Disturbance compensation limiter 36c or 37c is configured to limit steering-motor current command feedback compensation Ifb from feedback compensator 36k with a limit value decreasing with an increase in an external force indicator indicative of an external force applied to steerable road wheels 4, 5, and configured to output a limited steering-motor current command feedback compensation Ifblim to totalizer 36m. In the first variation of the third embodiment as shown in FIG. 10, disturbance compensation limiter 36c is configured to limit steering-motor current command feedback compensation Ifb from feedback compensator 36k with a limit value decreasing with an increase in slip angle deviation Δβ, as in the first embodiment. In the second variation of the third embodiment as shown in FIG. 11, disturbance compensation limiter 36c is configured to limit steering-motor current command feedback compensation Ifb from feedback compensator 36k with a limit value decreasing with an increase in slip angle deviation Δβ, as in the second embodiment.

Totalizer 36m is configured to compute motor current command Ita (before the current limiter processing) by totalizing feedforward steering-motor current command Iff from feedforward compensator 36h, the limited steering-motor current command feedback compensation Ifblim from feedback compensation limiter 36c, and the disturbance compensation (transient-disturbance compensation) Irbst from robust compensator 16b. The other elements are same as in the first or second embodiment.

The following describes steering-output control operations of the steering apparatus of the third embodiment when an external force is applied to the steerable road wheels. In the steering apparatus of the third embodiment, steering-output controller 16 adjusts motor current command Ita to the electric motor of steering-output actuator 6 to decrease with an increase in slip angle deviation Δβ or external force Tf, in order to intentionally generate a steady-state deviation between desired road wheel steer angle θta and actual road wheel steer angle θt. Accordingly, when the vehicle is traveling with steerable road wheels 4 and 5 being input with an external force, a desired torsion between the steering-input section and the steering-output section is simulated with sufficient accuracy by means of the road wheel steer angle deviation, to secure the stability of the vehicle cornering behavior, to improve the comfortability of the vehicle, and to improve the feeling of steering.

In the above-mentioned two-degree-of-freedom control system including feedforward compensator 36h and feedback compensator 36k, feedback compensator 36k compensates for errors with respect to normative model 36i, so that the response of actual road wheel steer angle θt with respect to desired road wheel steer angle θta is enhanced compared with the first and second embodiments.

If no torsion is simulated between the steering-input section and the steering-output section when the vehicle is traveling with steerable road wheels 4 and 5 input with an external force, the basic steering stiffness of the steering apparatus of the third embodiment is higher than those of the first and second embodiment. Accordingly, the simulation of torsion by the third embodiment is more effective for the stability of the vehicle dynamic behavior, the comfortability, and the steering feeling.

The following describes effects and advantages of the steering apparatus of the third embodiment. In the third embodiment, the steering apparatus produces the following effects and advantages (A8) in addition to the effects and advantages of the first and second embodiments except (A6).

(A8) The steering apparatus further including a steering output sensor (15) configured to measure the steering output (θt), wherein the steering controller (16) is configured to set the steering effort command (Ita) in accordance with the desired steering output (θta) and the measured steering output (θt), wherein the steering controller (16) includes: a feedforward compensator (36h) configured to determine a feedforward steering effort command (Iff) in accordance with the desired steering output (θta); a section configured to determine a normative steering output (θta_ref) in accordance with the desired steering output (θta), using a normative model of the vehicle; and a feedback compensator (36k) configured to determine a feedback compensation (Ifb) in accordance with a difference between the measured steering output (θt) and the normative steering output (θta_ref), and wherein the steering controller (16) is configured to adjust the feedback compensation (Ifb) to decrease with an increase in the disturbance indicator ($\Delta\beta$; Tf) for the adjusting the steering effort command (Ita), is effective for enhancing the response and trackability to desired road wheel steer angle $\theta$ta because of the two-degree-of-freedom control system, and effective for simulating with sufficient accuracy the torsion, to secure the stability of the vehicle cornering behavior, to improve the comfortability of the vehicle, and to improve the feeling of steering, when the vehicle is traveling with steerable road wheels 4 and 5 being input with an external force.

Although the means for measuring an external force indicator is configured to compute slip angle deviation $\Delta\beta$, or external force Tf in the above-mentioned embodiments, the means for measuring an external force indicator may be configured to measure any other external force indicator indicative of the external force indicator applied to steerable road wheels 4 and 5. For example, the following variables may be used as an external force indicator:

(i) vehicle slip angle,
(ii) deviation between a measured steering-motor torque and an estimated steering-motor torque computed in accordance with the steering-motor current command,
(iii) disturbance torque computed in accordance with the deviation between a measured steering-motor current and the steering-motor current command, or
(iv) deviation between a measured axial force of the steering rack shaft and an estimated steering-motor torque computed in accordance with the steering-motor current command.

Although the steering-output controller is configured to limit the output of the disturbance compensation from the robust compensator in the first and second embodiments, or configured to limit the output from the feedback compensator in the third embodiment, the steering-output controller may be configured in any other manner to adjust the motor torque command to the steering-output actuator to decrease with an increase in an external force indicator. For example, the steering-output controller may be configured to limit the final motor torque command (motor current command) to the steering actuator, or configured to limit both of the output from a robust compensator and the output from a feedback compensator in accordance with an external force indicator.

Figure 12:
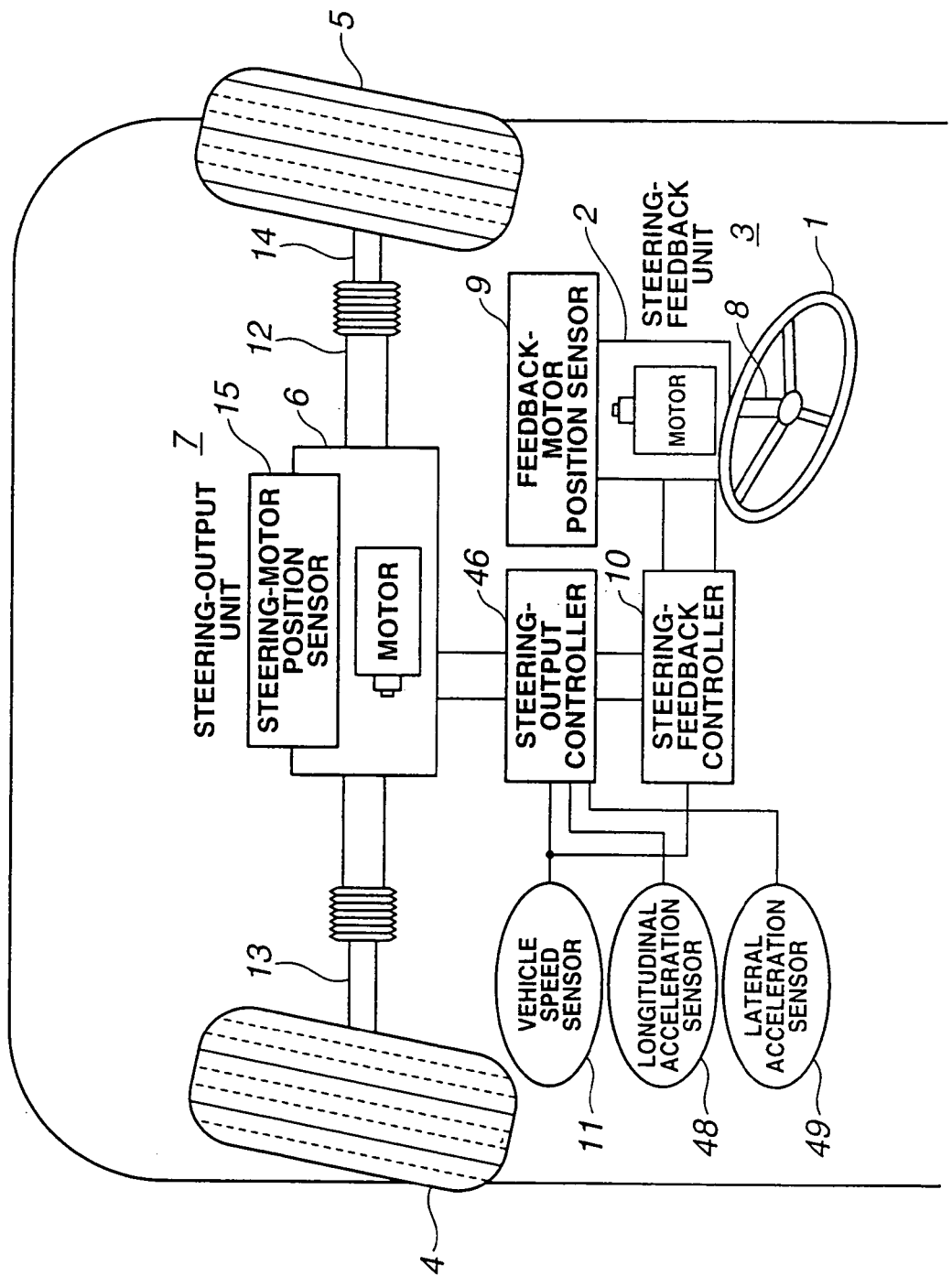
FIG. 12 is a schematic diagram showing an automotive vehicle with a steering apparatus in accordance with a fourth embodiment.
Figure 13:
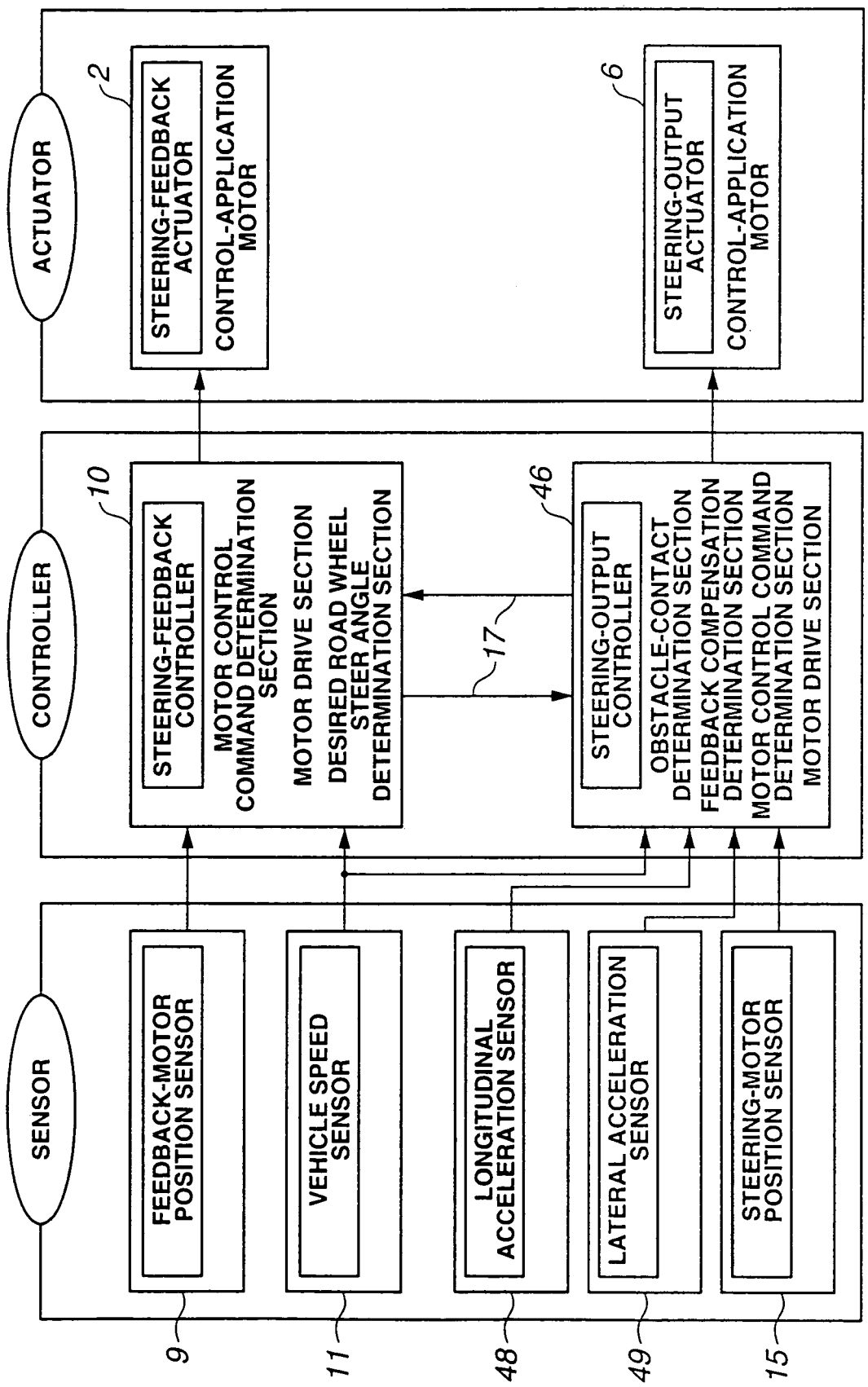
FIG. 13 is a schematic block diagram showing the steering apparatus of FIG. 12.

Referring now to FIGS. 12 through 22, there is shown a steering apparatus for a steerable vehicle in accordance with a fourth embodiment. FIG. 12 is a schematic diagram showing an automotive vehicle with a steering apparatus in accordance with the fourth embodiment. FIG. 13 is a schematic block diagram showing the steering apparatus of FIG. 12. As shown in FIGS. 12 and 13, the steering apparatus of the fourth embodiment is constructed by replacing steering-output controller 16, vehicle slip angle sensor 18, and external force sensor 19, of the steering apparatus of the first embodiment, with a steering-output controller (steering controller) 46, a longitudinal acceleration sensor 48, and a lateral acceleration sensor 49.

Steering-output controller 46 is provided and configured as an electrical control unit to control steering-output actuator 6. Steering-output controller 46 is connected to steering-feedback controller 10 with a bidirectional communication line 17 for mutual data exchange. Steering-output controller 46 is configured to receive input data from vehicle speed sensor 11, steering-motor position sensor 15, longitudinal acceleration sensor 48, and lateral acceleration sensor 49. Longitudinal acceleration sensor 48 is configured to measure a longitudinal acceleration of the vehicle. Lateral acceleration sensor 49 is configured to measure a lateral acceleration of the vehicle. Steering-output controller 46 includes an obstacle-contact determination section, a feedback compensation determination section, a steering-motor control command determination section, and a steering-motor drive section. The obstacle-contact determination section is configured to determine whether or not steerable road wheels 4, 5 are in contact with an obstacle. The feedback compensation determination section is configured to determine a compensation to steering-motor current command in accordance with the deviation between desired road wheel steer angle $\theta$ta and actual road wheel steer angle $\theta$t due to disturbance. The steering-motor control command determination section is configured to compute a steering-motor current command by subtracting the output of a robust compensator from the sum of the output of a feedforward compensator and the output of a feedforward compensator to obtain a steering-motor control driving-current command and by limiting the steering-motor current command within an upper limit. The steering-motor drive section includes a motor drive circuit converting the steering-motor control command into a driving-current command Ita to the electric motor of steering-output actuator 6.

Figure 14:
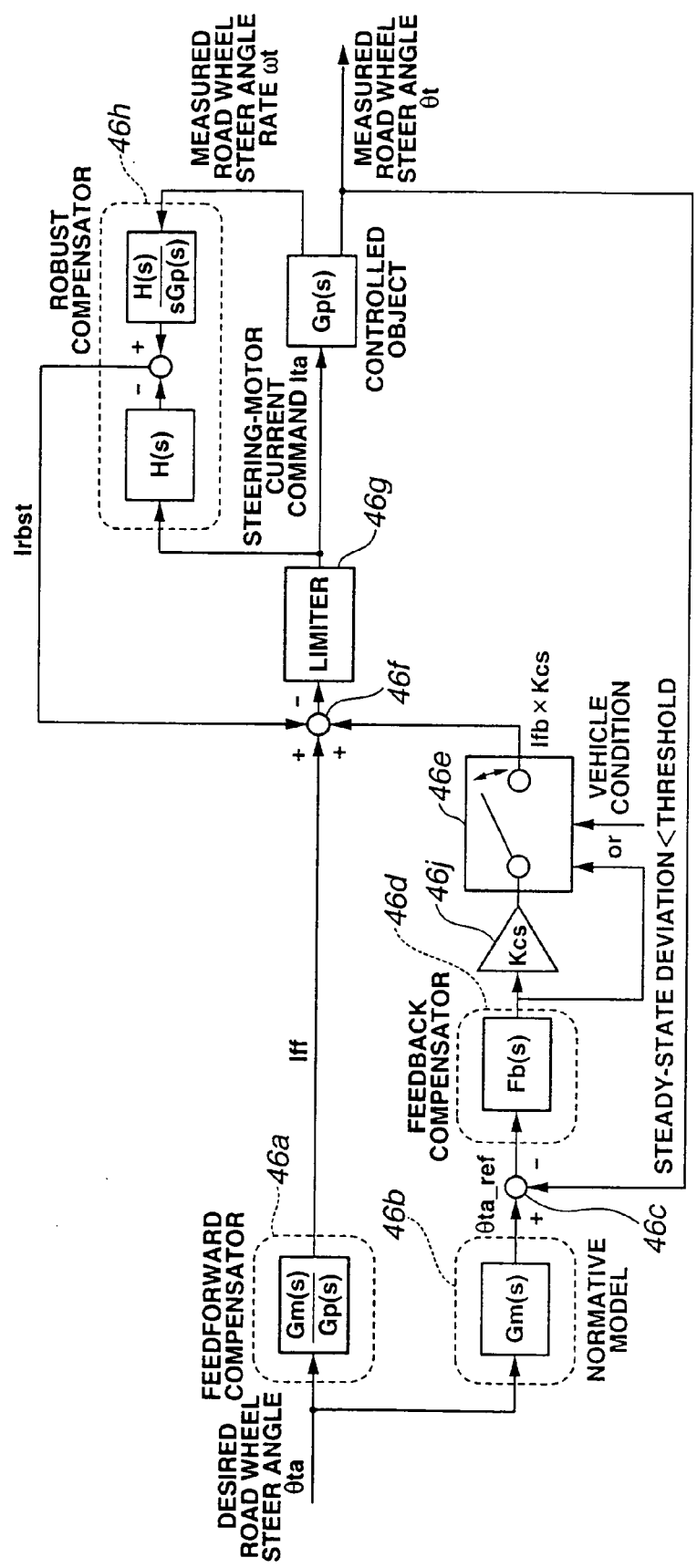
FIG. 14 is a system block diagram showing a steering-output control system in accordance with the fourth embodiment.

FIG. 14 is a system block diagram showing a steering-output control system in accordance with the fourth embodiment. As shown in FIG. 14, steering-output controller 46 includes a feedforward compensator 46a, a normative model 46b, a subtracter 46c, a feedback compensator 46d, a switch 46e, a totalizer 46f, a current limiter 46g, a robust compensator 46h, and an amplifier 46j.

Feedforward compensator 46a is configured to receive desired road wheel steer angle $\theta$ta, and to output a feedforward steering-motor current command Iff as a feedforward part of the steering-motor current command to totalizer 46f.

Normative model 46b is configured to receive desired road wheel steer angle $\theta$ta, and to generate a normative road wheel steer angle or reference road wheel steer angle $\theta$ta_ref by means of a normative model Gm(s).

Subtracter 46c is configured to compute a deviation by subtracting actual road wheel steer angle $\theta$t from reference road wheel steer angle $\theta$ta_ref output from normative model 46b.

Feedback compensator 46d is configured to receive the deviation between reference road wheel steer angle $\theta$ta_ref and actual road wheel steer angle $\theta$t, and to output a steering-motor current command feedback compensation Ifb as a feedback compensation to the steering-motor current command to feedback amplifier 46j.

Amplifier 46j is configured to receive steering-motor current command feedback compensation Ifb, to multiply steering-motor current command feedback compensation Ifb by gain Kcs, which is predetermined in accordance with the vehicle characteristics, and to output the value (Kcs·Ifb) (steady-state-disturbance compensation) to switch 46e.

Switch 46e is configured to be turned ON or OFF in accordance with the vehicle condition and etc. in order to determine whether to output the value (Kcs·Ifb) output from amplifier 46j to totalizer 46f.

Totalizer 46f is configured to compute motor current command Ita by subtracting disturbance compensation Irbst output from robust compensator 46h from feedforward steering-motor current command Iff output from feedforward compensator 46a. Totalizer 46f is further configured to add the value (Kcs·Ifb) output from amplifier 46j to motor current command Ita during switch 46e being ON.

Current limiter 46g is configured to limit an electric current through the electric motor of steering-output actuator 6 to prevent over-current. Specifically, current limiter 46g is configured to output motor current command Ita as it is in case motor current command Ita from totalizer 46f is smaller than or equal to a predetermined current limit value, and to output the current limit value as motor current command Ita in case motor current command Ita is larger than the current limit value. The motor current command Ita is output to the motor of steering-output actuator 6 as the controlled object Gp(s).

Robust compensator 46h is configured to receive motor current command Ita as an input to the controlled object Gp(s) and measured road wheel steer angle rate wt as an output from the controlled object, configured to estimate a disturbance which is a control interference factor including a modeling error such as an input from a bumpy road, a wavy road, or a rutted road to the steerable road wheels, and a torque steer due to a change in the load to the steerable road wheels in cornering or deceleration, or due to lateral variation in driving/braking torque between the steerable road wheels resulting from lateral variation in tire-road friction coefficient p, and configured to output the estimated disturbance. The disturbance compensation output Irbst from robust compensator 46h is used to adjust motor current command Ita in the steering-output control. In the fourth embodiment, feedback compensator 46d and robust compensator 46h serve as a disturbance determination section configured to determine a disturbance indicator indicative of a disturbance input to the vehicle.

Figure 15:
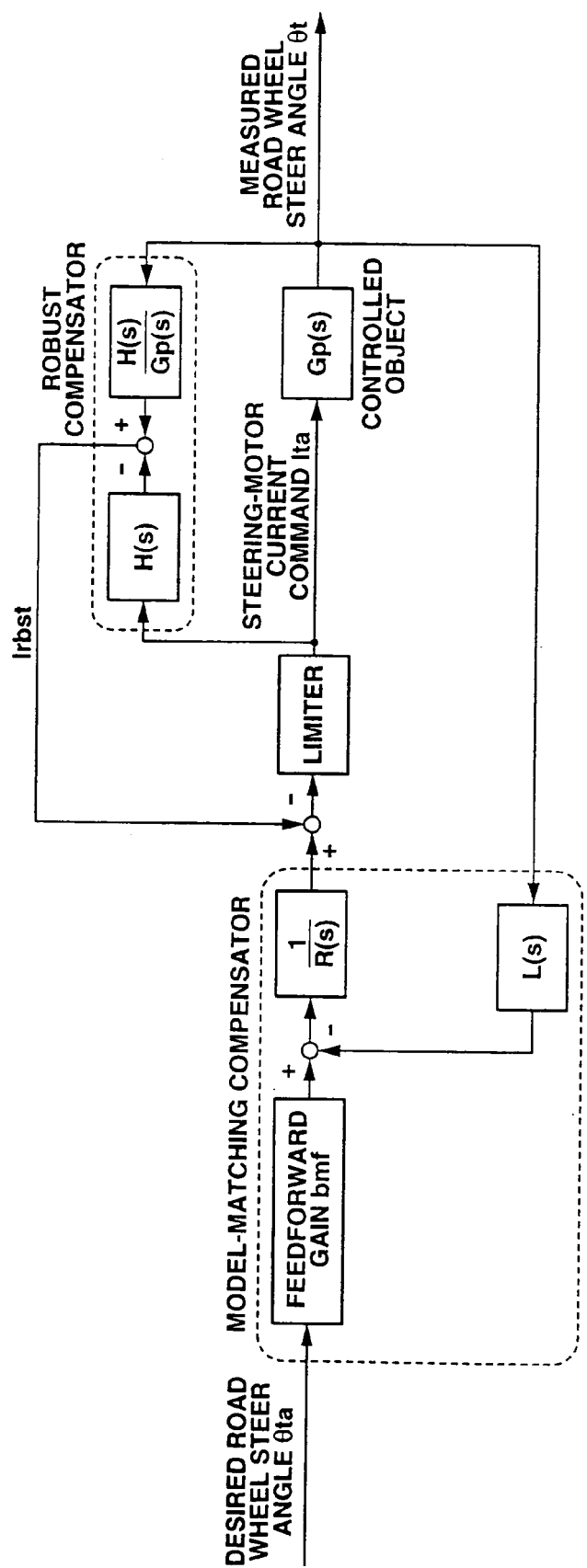
FIG. 15 is a system block diagram showing a steering-output control system constructed with a robust model matching technique in accordance with a reference embodiment.

As described above, the control system of steering-output controller 46 includes a two-degree-of-freedom control system including feedforward compensator 46e and feedback compensator 46d, robust compensator 46h, and switch 46e disposed at the output of feedback compensator 46d. FIG. 15 is a system block diagram showing a steering-output control system constructed with a robust model matching technique in accordance with a reference embodiment. Since robust compensator 46h uses no quantity of angle (measured road wheel steer angle θt) but a quantity of angular velocity (measured road wheel steer angle rate ωt) of a controlled object, the robust compensator 46h performs compensation in accordance with the transient component of disturbance, not in accordance with the steady-state component of disturbance, in contrast to the reference embodiment of FIG. 15. Further, switching ON/OFF of switch 46e formed in the output stage of feedback compensator 46d determines whether to use the disturbance compensation from robust compensator 46h. With switch 46e being OFF, a steady-state deviation is generated between desired road wheel steer angle θta and actual road wheel steer angle θt. On the other hand, with switch 46e being OFF, an unintended deviation (deviation from neutral or deviation from intended deviation) owing to various factors such as disturbance is eliminated between desired road wheel steer angle θta and actual road wheel steer angle θt.

Figure 16:
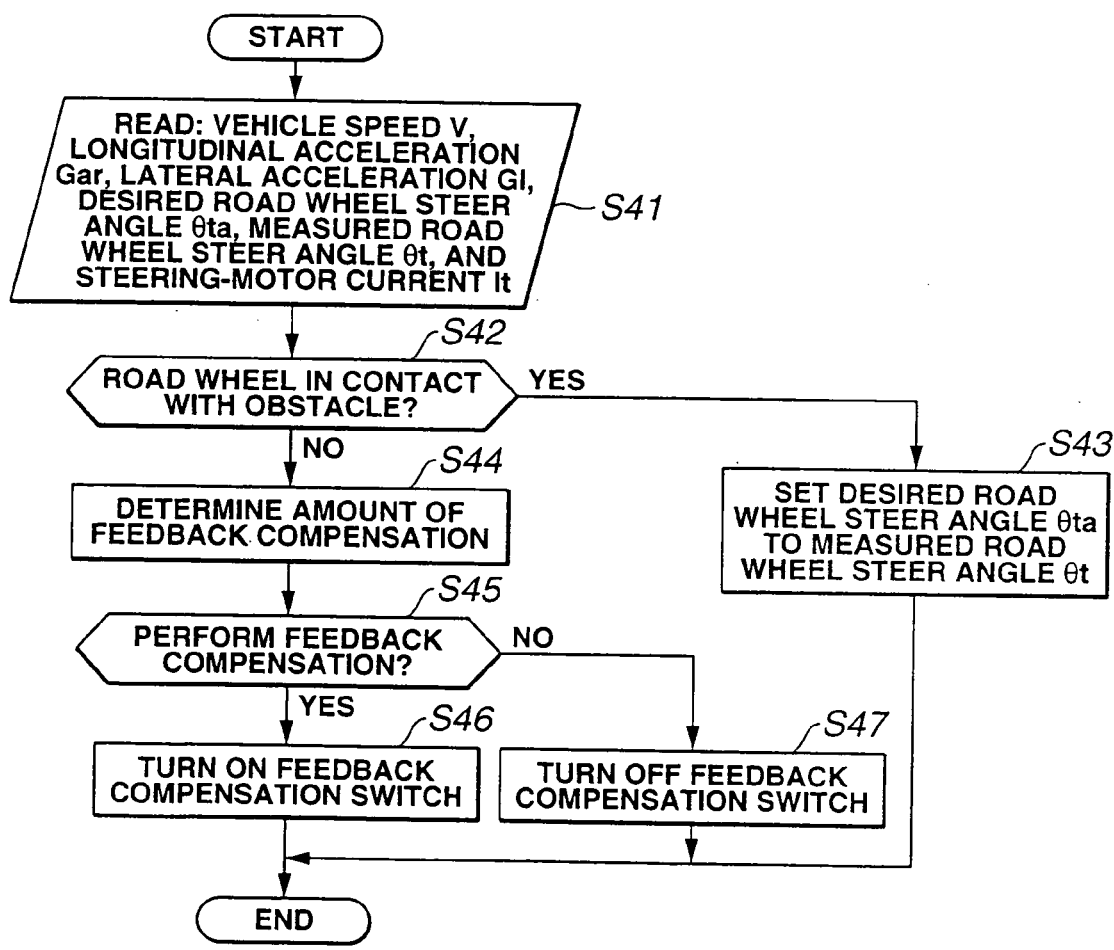
FIG. 16 is a flow chart showing a steering-output control processing to be performed by a steering-output controller of the steering apparatus of the fourth embodiment.

The following describes operations of the steering apparatus of the fourth embodiment. FIG. 16 is a flow chart showing a steering-output control processing to be performed by steering-output controller 46.

At step S41, steering-output controller 46 reads vehicle speed V from vehicle speed sensor 11, longitudinal acceleration Gar from longitudinal acceleration sensor 48, lateral acceleration Gl from lateral acceleration sensor 49, desired road wheel steer angle θta set according to actual steering wheel angle θs from feedback-motor position sensor 9, actual road wheel steer angle θt from steering-motor position sensor 15, and actual steering-motor driving current It from a steering-motor driving-current sensor (not shown) provided in the motor drive circuit. Subsequently, the routine proceeds to step S42. Covering variable steering ratio mechanisms, desired road wheel steer angle θta is determined as in the first embodiment.

At step S42, steering-output controller 46 determines whether or not steerable road wheels 4, 5 are in contact with an obstacle. When the answer to step S42 is YES, the routine proceeds to step S43. On the other hand, when the answer to step S42 is NO, the routine proceeds to step S44. This determination is performed as in the first embodiment.

At step S43, steering-output controller 46 sets desired road wheel steer angle θta to actual road wheel steer angle θt, based on the determination at step S42 that steerable road wheels 4, 5 are in contact with an obstacle. Subsequently, the routine returns.

At step S44, steering-output controller 46 computes the amount of compensation for the deviation between desired road wheel steer angle θta and actual road wheel steer angle θt due to the disturbance. Subsequently, the routine proceeds to step S45. The compensation amount is adjusted by a gain Kcs predetermined in accordance with the vehicle characteristics, in order to simulate differences in the steering stiffness, and adjusted in accordance with vehicle speed V (to decrease with an increase in vehicle speed V). For example, the gain Kcs of a sports-type car with a high steering stiffness is set larger than a sedan-type car.

At step S45, steering-output controller 46 determines whether or not to perform the feedback compensation operation. When the answer to step S45 is YES, the routine proceeds to step S46. On the other hand, when the answer to step S45 is NO, the routine proceeds to step S47. This determination is performed in accordance with longitudinal acceleration Gar, lateral acceleration Gl, and the operational state of steering wheel 1. In the fourth embodiment, steering-output controller 46 determines not to perform the feedback compensation operation, during at least one of the following conditions being satisfied, and determines to perform the feedback compensation is operation, during all the following conditions being unsatisfied.

Condition 1: The steady-state deviation determined by feedback compensator 46d is larger than or equal to a predetermined threshold such as a value equivalent to a steering wheel angle of 5°.

Condition 2: Longitudinal acceleration Gar is larger than or equal to a predetermined threshold Gath that is so large that the drive wheels slips.

Condition 3: Longitudinal acceleration Gar is smaller than or equal to a predetermined threshold Grth that is so large a negative value that the road wheels are locked.

Condition 4: Lateral acceleration Gl is larger than or equal to a predetermined threshold Glth that is so large that stickiness of inside road wheels to the ground is lost.

Condition 5: Steering wheel 1 is held. Specifically, the steering wheel angle of steering wheel 1 is held substantially constant over a predetermined period of time.

The above operation secures vehicle safety. Condition 5 is provided, since when steering wheel 1 is held, a driver is assumed to have an intention to hold the present condition.

At step S46, steering-output controller 46 turns switch 46e ON in conformance with the determination at step S45 that the feedback compensation is to be performed. Subsequently, the routine returns.

At step S47, steering-output controller 46 turns switch 46e OFF in conformance with the determination at step S45 that the feedback compensation is not to be performed. Subsequently, the routine returns.

The following describes steering-output control operations of the steering apparatus of the fourth embodiment. In contrast to the reference embodiment, the steering apparatus of the fourth embodiment controls steering-output actuator 6 by dividing the compensation for the estimated disturbance into a transient component and a steady-state component and by controlling the amount of the steady-state component of the compensation. Accordingly, when a disturbance is input, the steering apparatus of the fourth embodiment intentionally produces a steady-state deviation between desired road wheel steer angle θta and actual road wheel steer angle θt, to simulate a desired torsion between the steering-input section and the steering output section in accordance with disturbance, and to prevent a sense of incongruity of a driver.

Figure 19:
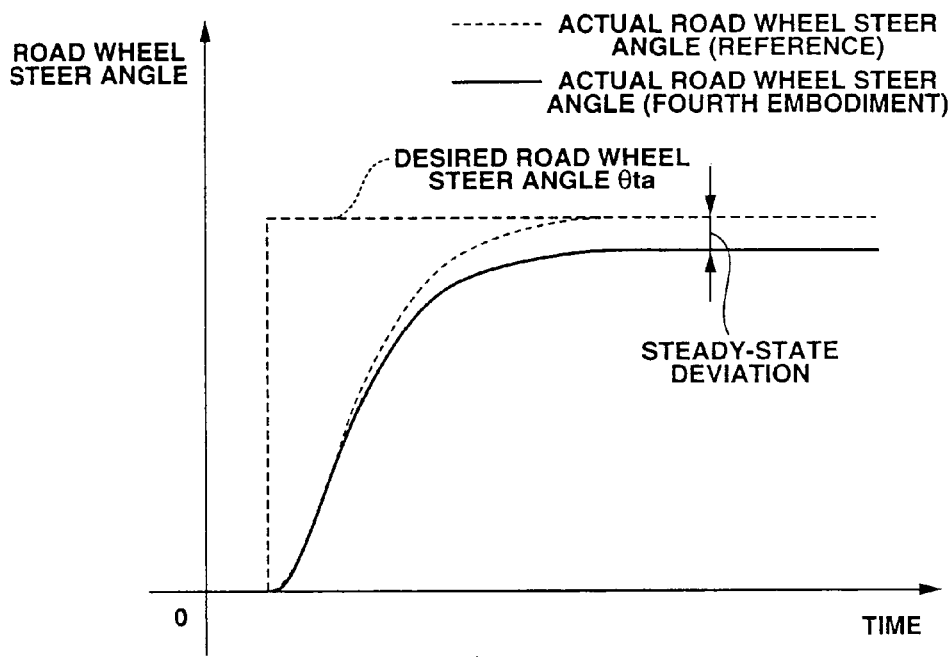
FIG. 19 is a view illustrating a sample response of an actual road wheel steer angle under control without disturbance compensation in accordance with the fourth embodiment and a response of an actual road wheel steer angle in accordance with a reference embodiment, with respect to a desired road wheel steer angle, where errors are present in the steering-output control system.

When steerable road wheels 4, 5 are in contact with no obstacle and the steady-state deviation determined by feedback compensator 46*d* is larger than or equal to the threshold, the routine proceeds in order of steps S41, S42, S44, S45, and S47 in the flow chart of FIG. 16. At step S47, switch 46*e* is turned OFF. Accordingly, the amount of compensation for steady-state component of disturbance is set to zero. Therefore, a steady-state deviation is generated between desired road wheel steer angle θta and actual road wheel steer angle θt, as shown in FIG. 19.

Figure 20:
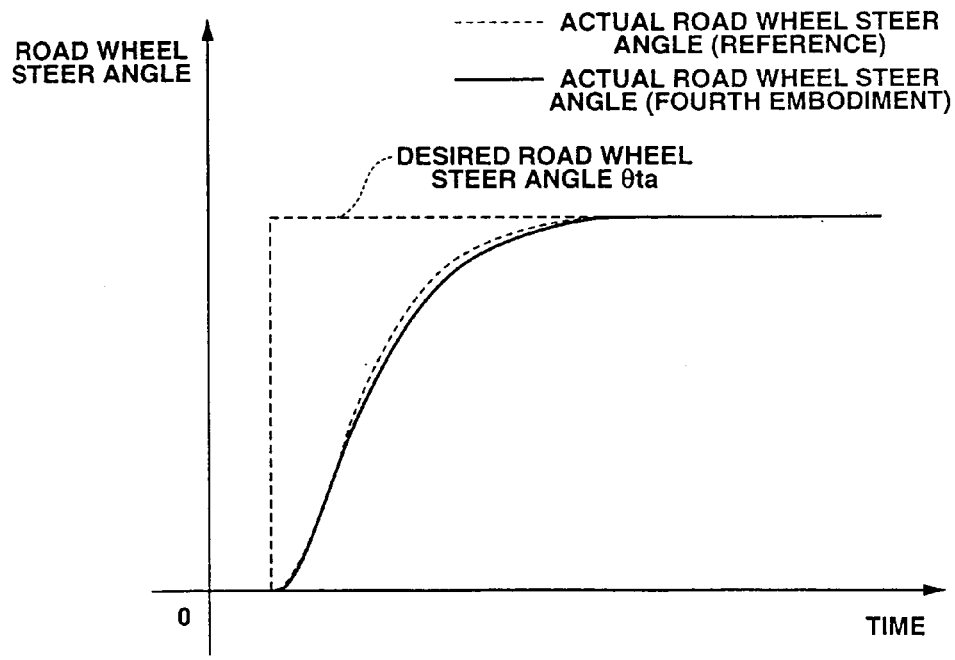
FIG. 20 is a view illustrating a sample response of an actual road wheel steer angle under control with disturbance compensation in accordance with the fourth embodiment and a response of an actual road wheel steer angle in accordance with a reference embodiment, with respect to a desired road wheel steer angle, where errors are present in the steering-output control system.

On the other hand, when the steady-state deviation determined by feedback compensator 46*d* is smaller than the threshold, the routine proceeds in order of steps S41, S42, S44, S45, and S46 in the flow chart of FIG. 16. At step S46, switch 46*e* is turned ON. Accordingly, motor current command Ita is compensated in accordance with the compensation for deviation due to the steady-state component of disturbance. This prevents control errors and adverse effects to steering feeling resulting from the deviation in accordance with disturbance, as shown in FIG. 20.

On the other hand, when it is determined that steerable road wheels 4 and 5 are in contact with an obstacle, the routine proceeds in order of steps S41, S42, and S43 in the flow chart of FIG. 16. At step S43, desired road wheel steer angle θta is set to actual road wheel steer angle θt, that is, the deviation between desired road wheel steer angle θta and actual road wheel steer angle θt is controlled to be zero. Thus, the current command to the steering-output section motor is not set to a value equivalent to desired road wheel steer angle θta in the steering-output section according to actual steering wheel angle θs as usual, but set to a value in such a manner that the deviation between desired road wheel steer angle θta and actual road wheel steer angle θt is zero. With this setting, even when a driver further turns steering wheel 1, the steering-output section no longer moves. Accordingly, the amount of the motor current to cancel the deviation between desired road wheel steer angle θta and actual road wheel steer angle θt is unnecessary. Only the amount of the motor current to hold road wheel steer angle θt in the present position is enough. Therefore, the steering apparatus of the first embodiment limits the current to the motor, to protect the motor against overheating. In addition, when steerable road wheels 4 and 5 are in contact with an obstacle, desired road wheel steer angle θta in the steering-output section is changed without directly changing the current command to the steering-output section motor to a certain value. Accordingly, the control mode is smoothly shifted again from the control for obstacle-contact conditions to the usual road wheel steer angle control.

Figure 21A:
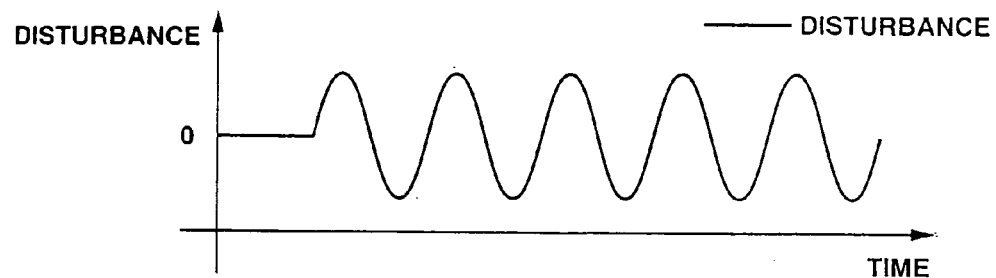
FIGS. 21A and 21B are views illustrating a sample response of an actual road wheel steer angle under control without feedback compensation in accordance with the fourth embodiment and a response of an actual road wheel steer angle in accordance with a reference embodiment, with respect to a desired road wheel steer angle, where disturbance is input to the steering-output control system.
Figure 21B:
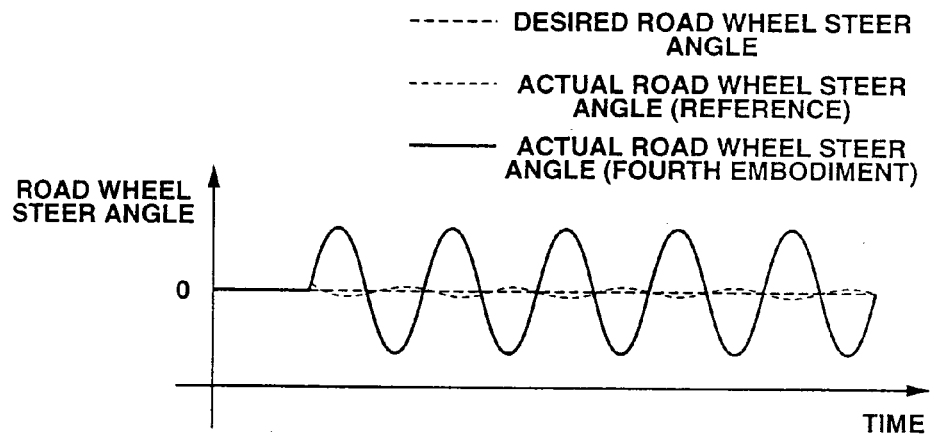

FIGS. 21A and 22B are views illustrating a sample response of actual road wheel steer angle θt under control without feedback compensation with switch 46*e* being OFF in accordance with the fourth embodiment and a response of actual road wheel steer angle θt in accordance with a reference embodiment, with respect to desired road wheel steer angle θta, where disturbance is input to the steering-output control system. As shown in FIGS. 21A and 21B, when the steady-state deviation determined by feedback compensator 46*d* is larger than or equal to the threshold, the motor current command is uncompensated with the compensation for steady-state component of disturbance, to produce a steady-state deviation between desired road wheel steer angle θta and actual road wheel steer angle θt, and thereby to simulate a desired torsion between the steering-input section and the steering output section in accordance with disturbance.

Figure 22:
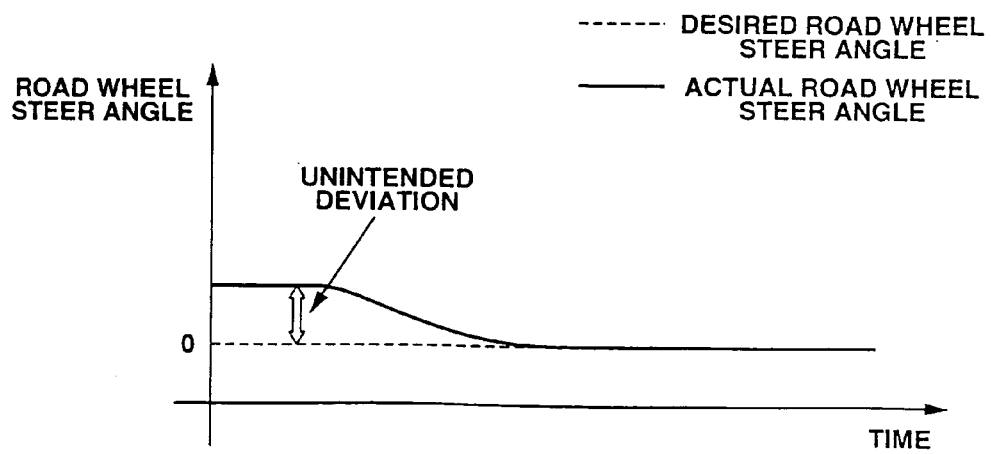
FIG. 22 is a view illustrating a sample response of an actual road wheel steer angle under control with disturbance compensation with respect to a desired road wheel steer angle in accordance with the fourth embodiment.

FIG. 22 is a view illustrating a sample response of actual road wheel steer angle θt under control with disturbance compensation with switch 46*e* being ON with respect to desired road wheel steer angle θta in accordance with the fourth embodiment. When actual road wheel steer angle θt deviates from neutral or from an intended deviation with respect to desired road wheel steer angle θta, the motor current command is compensated with the compensation for the steady-state component of disturbance, to quickly regulate actual road wheel steer angle θt to desired road wheel steer angle θta.

In the fourth embodiment, the steady-state-disturbance compensation is set in proportion to gain Kcs predetermined in accordance with the vehicle characteristics. Gain Kcs is set to increase with an increase in the stiffness of vehicle body. Accordingly, gain Kcs serves for simulating with sufficient accuracy a desired torsion between the steering-input section and the steering-output section in accordance with a desired steering stiffness of a vehicle (a sports-type car, a sedan-type car, etc.). Furthermore, the steady-state-disturbance compensation is set to decrease with an increase in vehicle speed V, since the change in the vehicle dynamic behavior due to the steady-state-disturbance compensation increases with an increase in vehicle speed V. Thus, the effect of vehicle speed V to the vehicle dynamic behavior is properly adjusted.

Even when actual road wheel steer angle θt deviates from desired road wheel steer angle θta in accordance with disturbance, the compensation for the steady-state component of disturbance is set to zero in case the vehicle is in a rapid acceleration/deceleration condition or in an excessive sideslip condition. Thus, in case the change in the vehicle dynamic behavior is large, the deviation due to disturbance is held to prevent the change in the vehicle dynamic behavior due to the cancellation of the deviation, and to stabilize the vehicle dynamic behavior. Furthermore, when steering wheel 1 is held constant, the compensation for the steady-state component of disturbance is set to zero. That is, when a driver is assumed to have no intention of steering and to have an intention to hold the current condition, the deviation due to the steady-state component of disturbance is left to prevent a sense of incongruity of the driver.

The following describes effects and advantages of the steering apparatus of the fourth embodiment ((B1)–(B10)).

(B1) The steering apparatus, wherein the disturbance determination section (46*h*, 46*d*) is configured to determine a transient component of the disturbance, and to determine a steady-state component of the disturbance, and wherein the steering controller (46) is configured to perform the following: determining a transient-disturbance compensation (Irbst) in accordance with the transient component of the disturbance; determining a steady-state-disturbance compensation (Ifb) in accordance with the steady-state component of the disturbance; and compensating the steering effort command (Ita) in accordance with the transient-disturbance compensation (Irbst) and the steady-state-disturbance compensation (Ifb), for the adjusting the steering effort command (Ita), is effective for compensating for transient control interference factors input during the road wheel steer angle changing, and producing a steady-state deviation between desired road wheel steer angle θta and actual road wheel steer angle θt in accordance with external forces. As a result, when the vehicle is traveling with steerable road wheels 4, 5 applied to with external forces, the stability of the cornering behavior is secured, and the comfortability and the steering feeling are improved. Since a special sensor is unnecessary to produce a steady-state deviation between desired road wheel steer angle θta and actual road wheel steer angle θt, its cost is canceled. In addition, motor current command Ita to the electric motor of steering-output actuator 6 for the control operation of producing a steady-state deviation between desired road wheel steer angle θta and actual road wheel steer angle θt is lower than that for the control operation of producing no deviation therebetween, so as to prevent a motor from being in an overheating condition.

(B2) The steering apparatus including feedforward compensator 46a configured to output feedforward steering-motor current command Iff in accordance with desired road wheel steer angle θta; robust compensator 46h configured to output disturbance compensation Irbst for the transient component of disturbance in accordance with the difference between actual road wheel steer angle rate ωt and motor current command Ita; feedback compensator 46d configured to output the steering-motor current command feedback compensation Ifb in accordance with the difference between reference road wheel steer angle θta_ref as the output from the normative model input with desired road wheel steer angle θta, and actual road wheel steer angle θt; amplifier 46j configured to multiply the steering-motor current command feedback compensation Ifb by gain Kcs according to the stiffness of vehicle body to produce compensation value (Kcs·Ifb) for the steady-state component of disturbance; switch 46e provided at the output stage of amplifier 46j and configured to be turned ON/OFF in accordance with the vehicle condition; and totalizer 46f configured to output motor current command Ita in accordance with feedforward steering-motor current command Iff, transient disturbance compensation Irbst, and steady-state disturbance compensation (Kcs·Ifb), is effective for changing the amount of compensation for a steady-state disturbance with a simple configuration.

(B3) The steering apparatus further including a steering output sensor (15) configured to measure a rate of change (ωt) in the steering output (θt), wherein the steering controller (46) is configured perform the following: estimating the rate of change in the steering output (θt) in accordance with the steering effort command (Ita); and estimating the transient component of the disturbance in accordance with a difference between the estimated rate of change and the measured rate of change (ωt), is effective for estimating the transient component of disturbance without using a special sensor, and for regulating the response of the steering-output control close to the response of the normative model 46b by means of the compensation for the transient component of disturbance when there are errors in the parameters due to the modeling error of controlled object Gp(s).

(B4) The steering apparatus further including a steering output sensor (15) configured to measure the steering output (θt), wherein the steering controller (46) is configured perform the following: estimating the steering output (θt) in accordance with the desired steering output (θta); and estimating the steady-state component of the disturbance in accordance with a difference between the estimated steering output (θta_ref) and the measured steering output (θt), is effective for estimating the steady-state component of disturbance without using a special sensor.

(B5) The steering apparatus wherein the steering controller (46) is configured to adjust the steady-state-disturbance compensation (Ifb) to increase with an increase in a body stiffness of the vehicle, is effective for simulating a natural torsion between steering wheel 1 and steerable road wheels 4 and 5 in accordance with a desired steering stiffness of a vehicle (a sports-type car, a sedan-type car, etc.)

(B6) The steering apparatus wherein the steering controller (46) is configured to adjust the steady-state-disturbance compensation (Ifb) to increase with an increase in a longitudinal speed (V) of the vehicle, is effective for preventing an excessive change in the vehicle dynamic behavior due to the compensation for steady-state deviation, and for stabilizing the vehicle dynamic behavior in consideration of vehicle speed V.

(B7) The steering apparatus wherein the steering controller (46) is configured to set the steady-state-disturbance compensation (Ifb) to zero during the steering input (θs) being held constant, is effective for preventing a sense of incongruity of a driver when the driver desires the present steering state to be held.

(B8) The steering apparatus wherein the steering controller (46) is configured to set the steady-state-disturbance compensation (Ifb) to zero during a state of dynamic behavior of the vehicle being within a predetermined region, is effective for preventing an excessive change in the vehicle dynamic behavior due to the compensation for steady-state deviation, and for stabilizing the vehicle dynamic behavior.

(B9) The steering apparatus wherein the steering controller (46) is configured to set the steady-state-disturbance compensation (Ifb) to zero during the steady-state component of the disturbance being larger than or equal to a predetermined threshold value, is effective for preventing an excessive motor current, to protect the motor from overheating when steerable road wheels 4 and 5 are contact with an obstacle.

(B10) The steering apparatus further including: a feedback actuator (2) configured to generate a steering feedback to the steering input unit (1, 8) in accordance with a steering-feedback command (Tms); and a feedback controller (10) configured to set the steering-feedback command (Tms) in accordance with a difference between the desired steering output (θta) and the measured steering output (θt), is effective for informing a driver of external forces applied to steerable road wheels 4, 5 with a change in the steering feedback to steering wheel 1 when actual road wheel steer angle θt deviates from desired road wheel steer angle θta.

Figure 23:
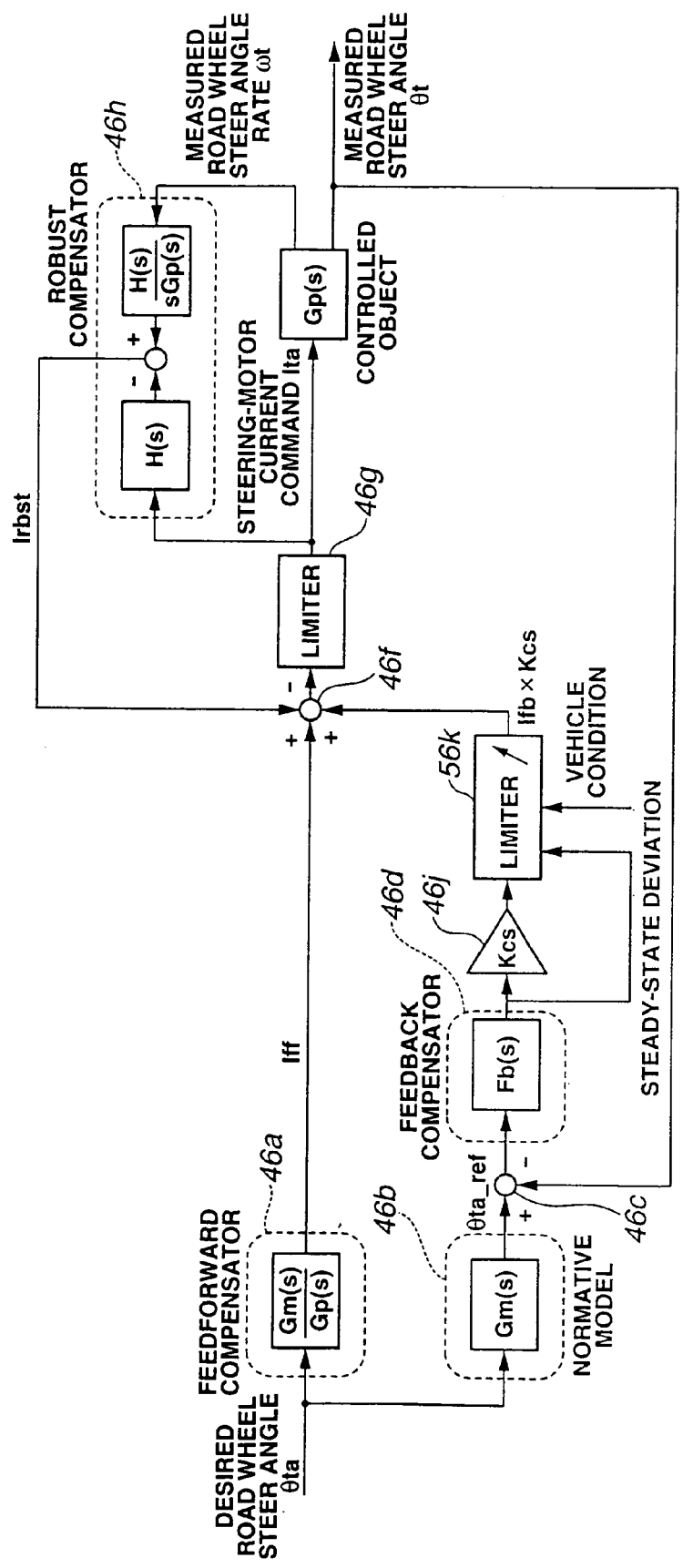
FIG. 23 is a system block diagram showing a steering-output control system in accordance with a fifth embodiment.
Figure 24:
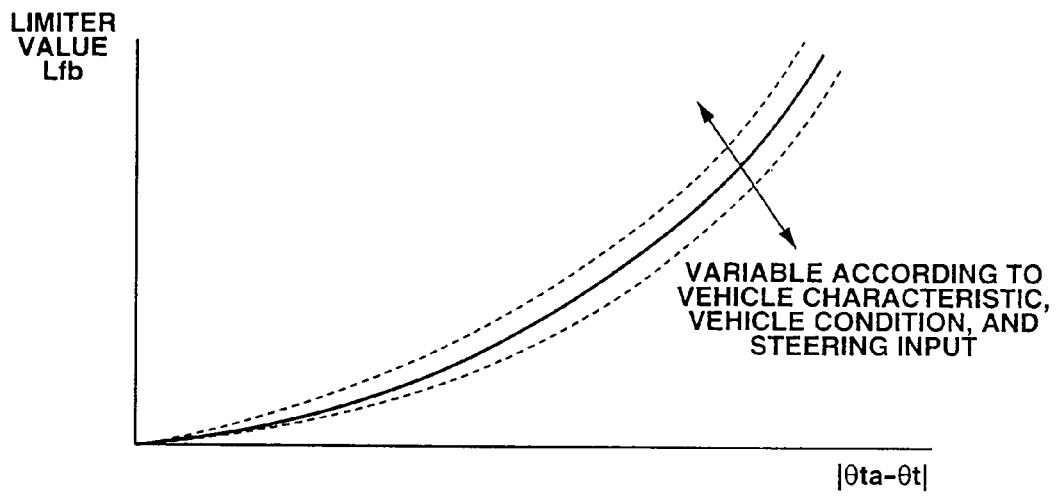
FIG. 24 is a view showing a map for setting a limiter value Lfb.
Figure 25:
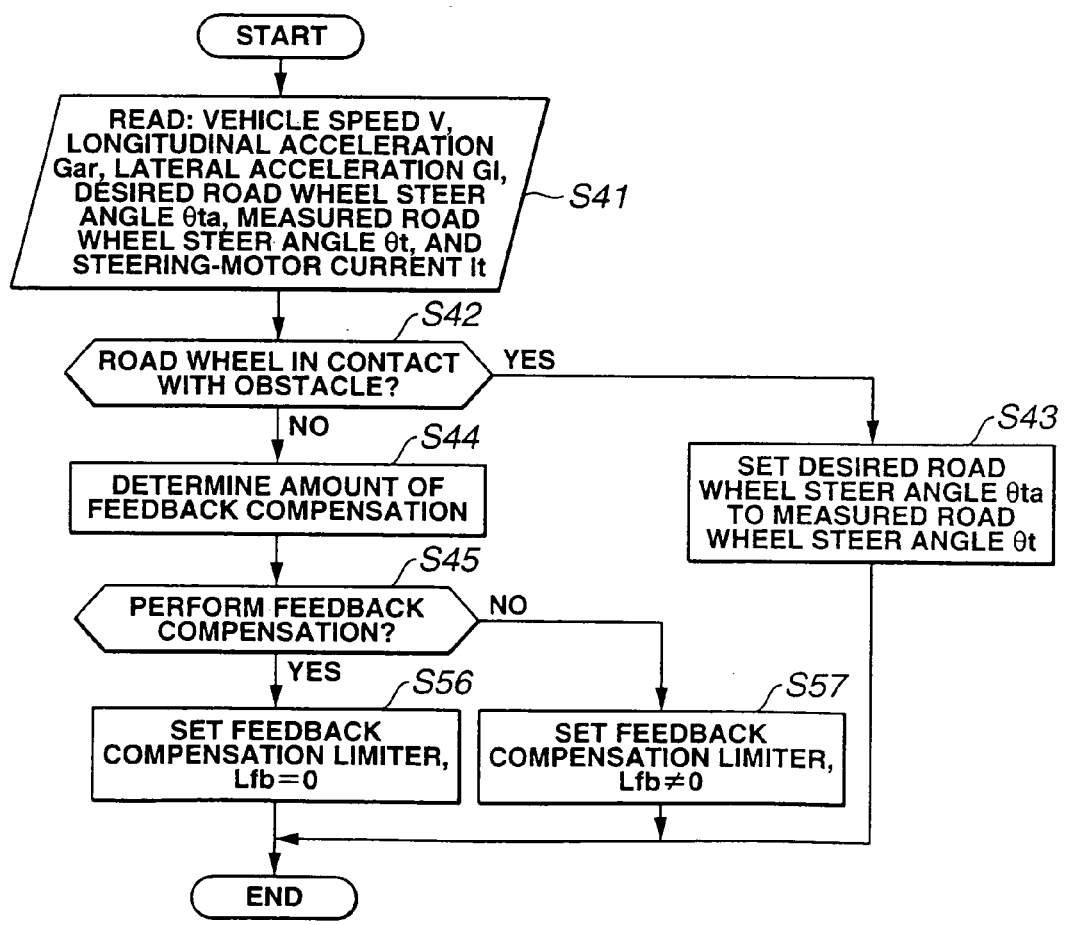
FIG. 25 is a flow chart showing a steering-output control processing to be performed by a steering-output controller of the steering apparatus of the fifth embodiment.

Referring now to FIGS. 23 through 25, there is shown a steering apparatus for a steerable vehicle in accordance with a fifth embodiment. FIG. 23 is a system block diagram showing a steering-output control system in accordance with the fifth embodiment. As shown in FIG. 23, switch 46e of the fourth embodiment of FIG. 5 is replaced with a feedback compensation limiter 56k formed at the output stage of feedback compensator 46d, in the fifth embodiment.

FIG. 24 is a view showing a map for setting a limiter value Lfb. As shown in FIG. 24, feedback compensation limiter 56k is configured to adjust limiter value Lfb to increase with an increase in the deviation between desired road wheel steer angle θta and actual road wheel steer angle θt. When the deviation is large, limiter value Lfb is set to a large value, to relax the limitation to the steering-motor current command feedback compensation Ifb, and to quickly eliminate the deviation. On the other hand, when the deviation is small, limiter value Lfb is set to a small value, to enhance the limitation to the steering-motor current command feedback compensation Ifb, for the feedback to act gently with respect to the deviation. In addition, limiter value Lfb is changed according to parameters, such as the vehicle characteristics, the vehicles condition, and the steering operational state, as follows.

(a) Limiter value Lfb is set to increase with an increase in the stiffness of the vehicle body.
(b) Limiter value Lfb is set to decrease with an increase in vehicle speed V.
(c) Limiter value Lfb is set to decrease with an increase in longitudinal acceleration Gar.
(d) Limiter value Lfb is set to decrease with an increase in lateral acceleration Gl.
(e) Limiter value Lfb is set to decrease with an increase in the steering wheel angle rate.

The following describes operations of the steering apparatus of the fifth embodiment. FIG. 25 is a flow chart showing a steering-output control processing to be performed by a steering-output controller of the fifth embodiment. As shown in FIG. 25, steps S46 and S47 in the flow chart of FIG. 16 in the fourth embodiment is replaced with steps S56 and S57, in the fifth embodiment.

At step S56, in conformance with the determination at step S45 that the feedback compensation is to be performed, steering-output controller 46 sets limiter value Lfb of feedback compensation limiter 56k in accordance with the stiffness of vehicle body, vehicle speed V, the longitudinal acceleration, the lateral acceleration, and the steering wheel angle rate. Subsequently the routine returns.

At step S57, in conformance with the determination at step S45 that the feedback compensation is not to be performed, steering-output controller 46 sets limiter value Lfb of feedback compensation limiter 56k to zero. Subsequently, the routine returns.

According to the above-mentioned operation, when the steady-state deviation in the road wheel steer angle determined by feedback compensator 46d is smaller than the threshold, motor current command Ita is compensated in accordance with the compensation for the steady-state component of disturbance, to reduce control errors generated due to disturbance and enhance the steering feeling. On the other hand, when the steady-state deviation in the road wheel steer angle determined by feedback compensator 46d is larger than or equal to the threshold, the compensation for the steady-state component of disturbance is set to zero, to produce a steady-state deviation between desired road wheel steer angle θta and actual road wheel steer angle θt.

Furthermore, the compensation for the steady-state component of disturbance is limited by an upper limit determined in accordance with the deviation between desired road wheel steer angle θta and actual road wheel steer angle θt, by setting limiter value Lfb to increase with an increase in the deviation between desired road wheel steer angle θta and actual road wheel steer angle θt. Accordingly, when the steady-state deviation in the road wheel steer angle determined by feedback compensator 46d is smaller than the threshold, the response of the steering-output control system is controlled in accordance with the deviation between desired road wheel steer angle θta and actual road wheel steer angle θt.

In the fifth embodiment, limiter value Lfb of feedback compensation limiter 56k is set to increase with an increase in the stiffness of vehicle body. Since the limitation to the compensation for the steady-state component of disturbance is relaxed with an increase in the body stiffness, the response of control is enhanced. In addition, limiter value Lfb of feedback compensation limiter 56k is set to decrease with an increase in vehicle speed V, longitudinal acceleration Gar, lateral acceleration Gl, to strengthen the limitation to the compensation for the steady-state component of disturbance. Accordingly, when the vehicle is in a condition where the dynamic behavior is largely changed, such as high-speed driving, sudden acceleration and deceleration, and quick turn, the feedback is gradually generated with respect to the deviation, so as to reduce the influence on the vehicle dynamic behavior.

The following describes effects and advantages of the steering apparatus of the fifth embodiment. In the fifth embodiment, the steering apparatus produces the following effects and advantages (B11) in addition to the effects and advantages (B1) through (B10) of the fourth embodiment.

(B11) The steering apparatus further including a steering output sensor (15) configured to measure the steering output (θt), wherein the steering controller (46) is configured to perform the following: determining an upper limit in accordance with a difference between the desired steering output (θta) and the measured steering output (θt); and limiting the steady-state-disturbance compensation (Ifb) within the upper limit, is effective for quickly reducing the deviation when the deviation is large, and for slowly reducing the deviation when the deviation is small.

Although the specific embodiments are described above, the feedback compensator may be replaced with any other means for estimating the steady-state component of disturbance. For example, the steering apparatus may employ a disturbance compensator configured to estimate the disturbance in accordance with motor current command Ita and actual road wheel steer angle θt, and a low-pass filter configured to receive the estimated disturbance and to provide an estimated steady-state deviation.

Although the steering apparatus is applied to the steer-by-wire system that the steering-input section and steering-output section are separated completely mechanically in the shown embodiments, the steering apparatus may be applied to a system where steering feedback is not transmitted to a steering wheel during normal conditions and where the steering-input section and steering-output section are mechanically connected as a fail-safe function. The steering apparatus may be also applied to a steering apparatus for a steerable vehicle, including: a steering actuator configured to generate a steering effort to regulate a steering output of the vehicle, in accordance with a steering effort command; a steering input unit configured to set a steering input; a disturbance determination section configured to determine a disturbance indicator indicative of a disturbance input to the vehicle; and a steering controller connected for signal communication to the steering actuator, the steering input unit, and the disturbance determination section, and configured to output the steering effort command to the steering actuator.

This application is based on a prior Japanese Patent Application No. 2004-299339 filed on Oct. 13, 2004, and a prior Japanese Patent Application No. 2004-361984 filed on Dec. 14, 2004. The entire contents of these Japanese Patent Application Nos. 2004-299339 and 2004-361984 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A steering apparatus for a steerable vehicle, comprising:
    a steering actuator configured to generate a steering effort to regulate a steering output of the vehicle, in accordance with a steering effort command;
    a steering input unit configured to set a steering input;
    a disturbance determination section configured to determine a disturbance indicator indicative of a disturbance input to the vehicle; and
    a steering controller connected for signal communication to the steering actuator, the steering input unit, and the disturbance determination section, and configured to perform the following:
        setting a desired steering output in accordance with is the steering input;
        setting the steering effort command in accordance with the desired steering output;
        adjusting the steering effort command in accordance with the disturbance indicator; and
        outputting the adjusted steering effort command to the steering actuator.

2. The steering apparatus as claimed in claim 1, wherein the steering controller is configured to adjust the steering effort command to decrease with an increase in the disturbance indicator.

3. The steering apparatus as claimed in claim 2, wherein the steering controller is configured to adjust the steering effort command to increase with an increase in a mechanical part of steering stiffness of the vehicle.

4. The steering apparatus as claimed in claim 1: wherein the vehicle is a wheeled vehicle; wherein the steering actuator is configured to generate a steering effort to regulate a steer angle of a road wheel of the vehicle, in accordance with the steering effort command; and wherein the steering input unit is a steering wheel configured to set a steering wheel angle as the steering input.

5. The steering apparatus as claimed in claim 4, further comprising a steering output sensor configured to measure the steering output, wherein the steering controller is configured to perform the following:
    determining whether or not the road wheel is in contact with an obstacle; and
    setting the desired steering output to the measured steering output, and inhibiting the adjusting the steering effort command, when it is determined that the road wheel is in contact with an obstacle.

6. The steering apparatus as claimed in claim 1, further comprising a steering output sensor configured to measure the steering output, wherein the steering controller is configured to set the steering effort command in accordance with the desired steering output and the measured steering output.

7. The steering apparatus as claimed in claim 6, further comprising:
    a feedback actuator configured to generate a steering feedback to the steering input unit in accordance with a steering-feedback command; and
    a feedback controller configured to set the steering-feedback command in accordance with a difference between the desired steering output and the measured steering output.

8. The steering apparatus as claimed in claim 6, wherein the steering controller includes a disturbance compensator configured to determine a disturbance compensation in accordance with the steering effort command and the measured steering output, and wherein the steering controller is configured to adjust the disturbance compensation to decrease with an increase in the disturbance indicator for the adjusting the steering effort command.

9. The steering apparatus as claimed in claim 6, wherein the steering controller includes:
    a feedforward compensator configured to determine a feedforward steering effort command in accordance with the desired steering output;
    a section configured to determine a normative steering output in accordance with the desired steering output, using a normative model of the vehicle; and
    a feedback compensator configured to determine a feedback compensation in accordance with a difference between the measured steering output and the normative steering output, and
    wherein the steering controller is configured to adjust the feedback compensation to decrease with an increase in the disturbance indicator for the adjusting the steering effort command.

10. The steering apparatus as claimed in claim 1, wherein the disturbance determination section is configured to determine a difference between a desired vehicle slip angle of the vehicle and an actual vehicle slip angle of the vehicle, as the disturbance indicator.

11. The steering apparatus as claimed in claim 1, wherein the disturbance determination section is configured to measure the steering effort as the disturbance indicator.

12. The steering apparatus as claimed in claim 1, wherein the disturbance determination section is configured to determine a transient component of the disturbance, and to determine a steady-state component of the disturbance, and wherein the steering controller is configured to perform the following:
    determining a transient-disturbance compensation in accordance with the transient component of the disturbance;
    determining a steady-state-disturbance compensation in accordance with the steady-state component of the disturbance; and
    compensating the steering effort command in accordance with the transient-disturbance compensation and the steady-state-disturbance compensation, for the adjusting the steering effort command.

13. The steering apparatus as claimed in claim 12, further comprising a steering output sensor configured to measure a rate of change in the steering output, wherein the steering controller is configured perform the following:
    estimating the rate of change in the steering output in accordance with the steering effort command; and
    estimating the transient component of the disturbance in accordance with a difference between the estimated rate of change and the measured rate of change.

14. The steering apparatus as claimed in claim 12, further comprising a steering output sensor configured to measure the steering output, wherein the steering controller is configured perform the following:
    estimating the steering output in accordance with the desired steering output; and
    estimating the steady-state component of the disturbance in accordance with a difference between the estimated steering output and the measured steering output.

15. The steering apparatus as claimed in claim 12, wherein the steering controller is configured to adjust the steady-state-disturbance compensation to increase with an increase in a body stiffness of the vehicle.

16. The steering apparatus as claimed in claim 12, wherein the steering controller is configured to adjust the steady-state-disturbance compensation to increase with an increase in a longitudinal speed of the vehicle.

17. The steering apparatus as claimed in claim 12, wherein the steering controller is configured to set the steady-state-disturbance compensation to zero during the steering input being held constant.

18. The steering apparatus as claimed in claim 12, wherein the steering controller is configured to set the steady-state-disturbance compensation to zero during a state of dynamic behavior of the vehicle being within a predetermined region.

19. The steering apparatus as claimed in claim 12, wherein the steering controller is configured to set the steady-state-disturbance compensation to zero during the steady-state component of the disturbance being larger than or equal to a predetermined threshold value.

20. The steering apparatus as claimed in claim 12, further comprising a steering output sensor configured to measure the steering output, wherein the steering controller is configured to perform the following:
   determining an upper limit in accordance with a difference between the desired steering output and the measured steering output; and
   limiting the steady-state-disturbance compensation within the upper limit.

21. A steering apparatus for a steerable vehicle, comprising:
   steering actuation means for generating a steering effort to regulate a steering output of the vehicle, in accordance with a steering effort command;
   steering input means for setting a steering input;
   disturbance determination means for determining a disturbance indicator indicative of a disturbance input to the vehicle; and
   steering control means for performing the following:
      setting a desired steering output in accordance with the steering input;
      setting the steering effort command in accordance with the desired steering output;
      adjusting the steering effort command in accordance with the disturbance indicator; and
      outputting the adjusted steering effort command to the steering actuation means.

22. A method of controlling a steerable vehicle including a steering actuator configured to generate a steering effort to regulate a steering output of the vehicle, in accordance with a steering effort command; a steering input unit configured to set a steering input; and a disturbance determination section configured to determine a disturbance indicator indicative of a disturbance input to the vehicle, the method comprising:
   setting a desired steering output in accordance with the steering input;
   setting the steering effort command in accordance with the desired steering output;
   adjusting the steering effort command in accordance with the disturbance indicator; and
   outputting the adjusted steering effort command to the steering actuator.

* * * * *

UNITED STATES PATENT AND TRADEMARK OFFICE
CERTIFICATE OF CORRECTION

PATENT NO.        : 7,092,805 B2                                        Page 1 of 1
APPLICATION NO. : 11/248617
DATED             : August 15, 2006
INVENTOR(S)       : Toshiaki Kasahara and Kazutaka Adachi It is certified that error appears in the above-identified patent and that said Letters Patent is hereby corrected as shown below:

( * )   Notice: DELETE "This patent is subject to a terminal disclaimer"

Signed and Sealed this

Fourteenth Day of November, 2006

JON W. DUDAS
*Director of the United States Patent and Trademark Office*